United States Patent
Otsuka et al.

(10) Patent No.: US 7,130,154 B2
(45) Date of Patent: Oct. 31, 2006

(54) MAGNETIC HEAD SLIDER HAVING PROTRUSIONS PROVIDED ON THE MEDIUM-FACING SURFACE AND MANUFACTURING METHOD THEREFOR

(75) Inventors: Tomoo Otsuka, Niigata-ken (JP); Hirohisa Ishihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/448,998

(22) Filed: May 30, 2003

(65) Prior Publication Data
US 2003/0197978 A1    Oct. 23, 2003

Related U.S. Application Data

(62) Division of application No. 09/749,961, filed on Dec. 27, 2000, now Pat. No. 6,728,069.

(30) Foreign Application Priority Data

| Dec. 28, 1999 | (JP) | ................... 11-377343 |
| Jan. 13, 2000 | (JP) | ..................... 2000-004933 |
| Jan. 21, 2000 | (JP) | ..................... 2000-013490 |
| Apr. 7, 2000 | (JP) | ..................... 2000-107149 |
| Apr. 7, 2000 | (JP) | ..................... 2000-107150 |

(51) Int. Cl.
G11B 17/32    (2006.01)

(52) U.S. Cl. ..................................................... 360/237

(58) Field of Classification Search ............. 360/235.1, 360/235.2, 236.3, 236.6, 235.8, 237.1, 122, 360/237; 427/577
See application file for complete search history.

(56) References Cited

U.S. PATENT DOCUMENTS

| 5,841,608 A | 11/1998 | Kasamatsu et al. | |
| 6,441,999 B1 * | 8/2002 | Tang et al. | ............... 360/236.6 |
| 6,452,752 B1 * | 9/2002 | Boutaghou | ............... 360/237.1 |
| 6,572,935 B1 * | 6/2003 | He et al. | ..................... 427/577 |
| 6,583,953 B1 * | 6/2003 | Han et al. | ..................... 360/122 |
| 6,603,639 B1 * | 8/2003 | Polycarpou et al. | ..... 360/235.8 |

FOREIGN PATENT DOCUMENTS

| JP | 4-182916 | 6/1992 |
| JP | 05-307852 | 11/1993 |
| JP | 06-131622 | 5/1994 |
| JP | 07-045027 | 2/1995 |

(Continued)

OTHER PUBLICATIONS

Copy of the Notification of Reason for Refusal issued on Jan. 15, 2004 for corresponding Japanese Patent Application No. 2000-107149.

(Continued)

*Primary Examiner*—Tianjie Chen
(74) *Attorney, Agent, or Firm*—Brinks Hofer Gilson & Lione

(57) ABSTRACT

The present invention provides a magnetic head slider including rails formed on the medium-facing surface on the magnetic disk side for generating buoyant force so that the slider flies and moves above a magnetic disk to write or read magnetic information. In the magnetic head slider, a first carbon film having corrosion resistance is provided on the surfaces of the rails provided on the medium-facing surface of the slider body through an adhesive layer, protrusions formed by alternately laminating an intermediate film and a second carbon film are provided on the first carbon film, and at least the outermost second carbon film of the second carbon films, which constitute each of the protrusions, has abrasion resistance.

9 Claims, 19 Drawing Sheets

FOREIGN PATENT DOCUMENTS

| | | |
|---|---|---|
| JP | 07-065527 | 3/1995 |
| JP | 08-087733 | 4/1996 |
| JP | 08-171708 | 7/1996 |
| JP | 08-212740 | 8/1996 |
| JP | 10-003630 | 1/1998 |
| JP | 10-247367 | 9/1998 |
| JP | 10-269736 | 9/1998 |
| JP | 11-16315 | 1/1999 |
| JP | 11-25630 | 1/1999 |
| JP | 11-203649 | 7/1999 |

OTHER PUBLICATIONS

Copy of the Notification of Reason for Refusal issued on Jan. 13, 2004 for corresponding Japanese Patent Application No. 2000-107150.

Copy of Office Action dated Dec. 9, 2005 for corresponding Chinese Application No. 200410074787.0.

* cited by examiner

MAGNETIC HEAD SLIDER HAVING PROTRUSIONS PROVIDED ON THE MEDIUM-FACING SURFACE AND MANUFACTURING METHOD THEREFOR

This application is a divisional application of U.S. application Ser. No. 09/749,961 filed on Dec. 27, 2000, now U.S. Pat. No. 6,728,069, entitled "Magnetic Head Slider Having Protrusions Provided On The Medium-Facing Surface And Manufacturing Method Therefor".

BACKGROUND OF THE INVENTION

1. Field of the Invention

The present invention relates to a magnetic head slider flying above a magnetic recording medium with a small distance therebetween to record and reproduce magnetic information, and a manufacturing method therefor. Particularly, the present invention relates to a technique for improving the abrasion resistance of protrusions provided on the medium-facing surface and rails of a slider body while maintaining the manufacturing efficiency high. The present invention also relates to a technique for preventing corrosion of a magnetic head core provided on the slider body.

2. Description of the Related Art

As a conventional magnetic recording apparatus for a computer, the magnetic disk device shown in FIG. 27 is known.

This magnetic disk device comprises a magnetic head slider 82 provided above a rotatable magnetic disk 81 opposite thereto. The magnetic head slider 82 is supported by a support arm 84 through a triangular spring plate 83 so that the magnetic head slider 82 can be moved to a desired position in the diameteral direction of the magnetic disk 81 by rotation of the support arm 84 around the rotation center 84*a*.

In the magnetic disk device shown in FIG. 27, with the magnetic disk 81 stopped, the bottom of the magnetic head slider 82 is lightly pressed on the magnetic disk 81 by urging force of the spring plate 83 for supporting the magnetic head slider 82, while with the magnetic disk 81 rotated, the magnetic head slider 82 flies and moves above the magnetic disk 81 at a predetermined height by means of an air flow accompanying rotation. When the rotation of the magnetic disk 81 is stopped, the flying and moving magnetic head slider 82 is again stopped by contact with the magnetic disk 81. However, in flying and moving, magnetic information is read from or written on the magnetic recording layer of the magnetic disk 81. The series of operations is generally referred to as "CSS (contact start stop)".

FIGS. 28 to 30 are drawings showing the two-rail type magnetic head slider 82 conventionally used in a wide range. FIG. 28 is a side view showing a state in which the magnetic head slider 82 flies and moves, FIG. 29 is a side view showing a static state, and FIG. 30 is an enlarged sectional view of the magnetic head slider 82 taken along the length direction of side rails 86. The magnetic head slider 82 comprises a groove (not shown) formed at the center of the bottom thereof, and the side rails 86 formed on both sides of the groove. Each of the side rails 86 has an inclined surface 86*a* formed on the lower side at the front end thereof (on the upstream side in the rotational direction of the magnetic disk 81) so that air flows along the inclined surfaces 86*a* as shown by arrows A in FIG. 28 to float and move the magnetic head slider 82 by means of the bottom of the side rails 86 of the magnetic head slider 82, which serves as a positive pressure generating portion.

A magnetic head is also known, in which as shown by a two-dot chain line in FIG. 28, a negative pressure groove 86*b* is formed at the bottom of the side rails 86 so that the negative pressure produced by the negative pressure groove 86*b* and the positive pressure produced by the side rails 86 are balanced to stabilize flying and moving performance.

Furthermore, an adhesive film 91 of Si is formed on the surface of each of the side rails 86, and a first carbon film 92 is formed on the adhesive layer 91, as shown in FIG. 30.

FIG. 28 is a side view showing a state of the magnetic head slider 82. When the magnetic head slider 82 flies and moves, air flows to the bottom side of the magnetic head slider 82 through the inclined surfaces 86*a*, and with the negative groove 86*b* formed, negative pressure is produced on the rear side of the magnetic head. Therefore, the magnetic head slider 82 flies and moves in an inclined state at a small angle in which the air inflow side is inclined upward, as shown in FIG. 28. The inclination angle is generally referred to as a "pitch angle" (usually about 100 μRad).

The magnetic head slider 82 having the above-described construction is brought into sliding contact with the magnetic disk 81 when the magnetic disk 81 is started (rising) and stopped (falling). In order to prevent abrasion and wear of the surface of the magnetic disk, a protecting film is formed on the recording layer of the magnetic disk 81, and a lubricating layer is further formed on the protecting film.

In the magnetic head slider 82 having the above construction, from the viewpoint of magnetic recording, it is advantageous that during flying, the magnetic gap G of the magnetic head slider 82 is brought as near the magnetic recording layer of the magnetic disk 81 as possible. Therefore, in flying and moving, the height of the magnetic head slider 82 is preferably as low as possible. In recent years, the amount of flying (the spacing between the magnetic head slider 82 and the magnetic disk 81) of the magnetic head slider 82 has been further decreased with increasing recording densities and miniaturization of a magnetic disk device. In order to decrease the flying amount, the surface roughness of the magnetic disk 81 must be decreased as much as possible for avoiding contact between the magnetic head slider 82 in the flying state and the magnetic disk 81.

However, in starting or stopping the magnetic disk 81, the area of contact between the magnetic disk 81 and the magnetic head slider 82 increases as the surface of the magnetic disk 81 becomes smooth, to easily cause adhesion between the slider 82 and the magnetic disk 81. This increases adhesion torque to increase the load at the start of a motor for rotating the magnetic disk 81 and easily break the support arm 84, the magnetic head element provided on the slider or the magnetic disk recording layer at the start of rotation of the magnetic disk 81. Therefore, in order to solve this problem, protrusions 89 are provided on the air inlet side and outlet side of each of the side rails 86 through the adhesive layer and the first carbon film to decrease the area of contact with the magnetic disk 81. Each of the protrusions 89 comprises an intermediate film 93 made of Si, and a second carbon film 94 formed thereon. The first and second carbon film 92 and 94 generally comprise the same material from the viewpoint of manufacturing efficiency, etc.

An example of the manufacture of a conventional magnetic head slider having the above construction will be described below.

First, the adhesive layer 91 made of Si, the first carbon film 92, the intermediate film 93 made of Si, and the second carbon film 94 are deposited by sputtering on the medium-facing surface of a plate on the magnetic disk side thereof, which is composed of Al$_2$O$_3$TiC and comprises a magnetic head core 90. Then, the multilayer film comprising the adhesive layer 91, the first carbon film 92, the intermediate film 93 and the second carbon film 94 is patterned to form the side rails 86 and the groove therebetween on the medium-facing surface. The multilayer film remains on the surface of each of the side rails 86, and the surface of the plate is exposed from the groove between the side rails 86. Then, the intermediate film 93 and the second carbon film 94 on each of the side rails 86 are patterned to form the protrusion 89. As a result the magnetic head slider 82 shown in FIGS. 28 to 30.

In the conventional magnetic head slider having the above construction, in starting or stopping the magnetic disk 81, the protrusions 89 are readily worn due to friction in sliding on the magnetic disk 81, thereby causing the problem of deteriorating the effect of the protrusions 89. Therefore, as the material for the first and second carbon films 92 and 94, diamond-like carbon having good abrasion resistance is possibly used. However, the diamond-like carbon has low compactness and low degree of adhesion, and thus use as the material for the first carbon film 92 produces low corrosion resistance, causing the problem of deteriorating the magnetic core provided on the slider body.

When the surface area of the protrusions 89 on the magnetic disk side is decreased to decrease the area of contact with the magnetic disk 81, the adhesion force between the slider 82 and the magnetic disk 81 can be decreased. However, in this case, the planar pressure applied to the protrusions 89 is increased to cause the problem of increasing abrasion.

As described above, in the magnetic head slider, the height of the magnetic head slider 82 in flying and moving tends to be increased due to demand for increasing the recording density and decreasing the size of the magnetic disk device, and the pitch angle is accordingly decreased.

However, in the conventional magnetic head slider shown in FIG. 31, decreasing the pitch angle causes the protrusions 89*b* on the air flow outlet side (near the magnetic gap G) to project from the magnetic gap G toward the magnetic disk side during flying. In order to avoid this problem, the positions of the protrusions 89*b* are moved from the magnetic gap G to the air flow inlet side 82*a* by L$_1$, as shown by a broken line in FIG. 31.

However, where the positions of the protrusions 89*a* are moved to the air flow inlet side 82*a*, at a stop of the magnetic disk 81, the portion (near the magnetic gap G) of the medium-facing surface of the magnetic head slider 82, where no protrusion is provided, adheres to the magnetic disk 81 due to a liquid lubricant film coated on the surface of the magnetic disk 81 to cause the problem of increasing adhesion torque.

SUMMARY OF THE INVENTION

The present invention has been achieved in consideration of the above situation, and a first object of the present invention is to provide a magnetic head slider in which the abrasion resistance of protrusions provided on the medium-facing surface and rails of the slider body can be improved, and corrosion of a magnetic head core provided on the slider body can be improved.

A second object of the present invention is to provide a magnetic head slider in which the abrasion resistance of protrusions provided on rails of the slider can be improved to prevent an increase in adhesion force between the slider and a magnetic disk.

A third object of the present invention is to provide a magnetic head slider in which can further decrease adhesion between a magnetic disk and the slider body comprising protrusions provided on the medium-facing surface and rails on the magnetic disk side.

In order to achieve the objects, in accordance with a first aspect of the present invention, there is provided a magnetic head slider comprising a magnetic head core provided in a plate-shaped slider body, and rails formed on the medium-facing surface of the slider body on the magnetic disk side, for generating flying force so that the slider flies and moves above a magnetic disk to write or read magnetic information, wherein a first carbon film having corrosion resistance is provided on at least the surfaces of the rails among the medium-facing surface and the rails of the slider body through an adhesive layer, protrusions formed by alternately laminating an intermediate film and a second carbon film are provided on the first carbon film, and at least the outermost second carbon film of the second carbon films, which constitute each of the protrusions, has abrasion resistance.

In the magnetic head slider having the above construction, the second carbon film having abrasion resistance is formed on the outermost surface of each of the protrusions to prevent abrasion of the protrusions during sliding on the magnetic disk when the magnetic disk is stared and stopped, thereby significantly improving the abrasion resistance of the protrusions. Furthermore, at least the surfaces of the rails among the medium-facing surface and the rails of the slider body are coated with the first carbon film having corrosion resistance to prevent corrosive deterioration of the magnetic head core provided in the slider body.

As described above, since the abrasion resistance of the protrusions is significantly improved, an increase in the area of contact between the slider and the magnetic disk can be prevented. Therefore, it is possible to prevent the magnetic head element provided on the magnetic head core, and the recording layer of the magnetic disk from being damaged due to an increase in adhesion force between the slider and the magnetic disk at a start of rotation of the magnetic disk.

Furthermore, in forming the first and second carbon films having the above-described properties by an ECRCVD (Electron Cyclotron Resonance Chemical Vapor Deposition) method, the carbon films having different properties can be efficiently produced by changing the types of reaction gases (gases containing carbon) supplied into a deposition apparatus, and controlling a substrate bias.

Therefore, in the magnetic head slider of the present invention, the abrasion resistance of the protrusions provided on the medium-facing surface and the rails of the slider body can be improved while the manufacturing efficiency kept high, and corrosion of the magnetic head core provided in the slider body can be prevented.

In the magnetic head slider of the present invention, the first carbon film having corrosion resistance preferably comprises a carbon film having a hydrogen content of 30 atomic % or more, and the second carbon film having abrasion resistance preferably comprises a carbon film having a film hardness of 22 GPa or more.

For example, in forming, by the ECRCVD method, the first carbon film having a hydrogen content of 30 atomic % or more on the intermediate film of the slider body, on which the adhesive layer, the first carbon film and the intermediate film are formed, the first carbon film can be deposited by changing the type of reaction gas (gas containing carbon) supplied into the deposition apparatus, and controlling the substrate bias (decreasing the substrate bias). By using methane gas as the reaction gas, the carbon film having a hydrogen content of 35 atomic % or more can be deposited. By using ethylene gas as the reaction gas, the carbon film having a hydrogen content of over 30 atomic % can be deposited by controlling the substrate bias.

In this way, the hydrogen content of the first carbon film formed to cover the surfaces of at least the rails among the medium-facing surface and the rails of the slider body is increased to decrease film hardness. However, the degree of compactness is increased due to the formation of an amorphous phase to increase the degree of adhesion, thereby preventing peeling. Therefore, the magnetic head core provided in the slider body can be prevented from deteriorating due to corrosion.

For example, in forming, by the ECRCVD method, the second carbon film having a film hardness of 22 GPa or more on the intermediate film of the slider body, on which the adhesive layer, the first carbon film and the intermediate film are formed, the second carbon film can be deposited by changing the type of the reaction gas (gas containing carbon) supplied into the deposition apparatus and controlling the substrate bias (increasing the substrate bias) so that the hydrogen content of the carbon film is decreased.

The hydrogen content of the second carbon film is preferably less than 30 atomic %.

In this way, the hydrogen content of the second carbon film which constitutes each of the protrusions is decreased to strengthen carbon atom bonding, and increase the hardness.

Also, the second carbon film may comprise a carbon film having a hydrogen content of 0 atomic %. Example of such a carbon film comprises cathodic arc carbon (CAC). The second carbon film comprising cathodic arc carbon can be deposited by, for example, arc discharge of a graphite block in a vacuum atmosphere in the deposition apparatus in which the slider body, on which the adhesive layer, the first carbon film and the intermediate film are formed, is arranged.

Furthermore, the magnetic head core of the magnetic head slider of the present invention preferably comprises a giant magnetoresistive element.

The method of manufacturing the magnetic head slider according to the first aspect of the present invention comprises the step of forming the adhesive layer and the first carbon film having corrosion resistance on the medium-facing surface on the magnetic disk side of the plate-shaped slider body comprising the magnetic core, the step of alternately forming the intermediate film and the second carbon film on the first carbon film so that the outermost second carbon film has abrasion resistance, and the step of patterning at least the outermost second carbon film and the intermediate film located below the outermost film in the multilayer film comprising the adhesive layer, the first carbon film, the intermediate film and the second carbon film to form protrusions.

The method of manufacturing the magnetic head slider having the above construction can be suitably used for manufacturing the magnetic head slider of the present invention.

In the method of manufacturing the magnetic head slider of the present invention having the above construction, the first carbon film having corrosion resistance preferably comprises a carbon film having a hydrogen content of 30 atomic % or more, and the second carbon film having abrasion resistance preferably comprises a carbon film having a film hardness of 22 GPa or more.

In accordance with a second aspect of the present invention, there is provided a magnetic head slider comprising a magnetic head core provided in a plate-shaped slider body so that the slider flies and moves above a magnetic disk to write or read magnetic information, wherein a rail and/or pad is formed for producing buoyant force on the medium-facing surface on the magnetic disk side of the slider body, and a protrusion having a film hardness of 22 GPa or more is formed on the rail and/or pad.

In the magnetic head slider having the above construction, the protrusion provided on the rail and/or pad has a film hardness of 22 GPa or more so that the abrasion resistance of the protrusion can be significantly improved to prevent wear of the protrusion in sliding on the magnetic disk at the time of start or stop of the magnetic disk, thereby preventing an increase in the area of contact between the slider and the magnetic disk, and an increase in adhesion force therebetween. Therefore, the magnetic head element provided on the magnetic head core and the recording layer of the magnetic disk can be prevented from being damaged due to an increase in the adhesion force between the slider and the magnetic disk when rotation of magnetic disk is started.

In the magnetic head slider of the present invention having the above construction, the protrusion preferably comprises a carbon film having a hydrogen content of less than 43 atomic %. In forming such a carbon film on the medium-facing surface on the magnetic disk side of the slider body, for example, by the ECRCVD (Electronic Cyclotron Resonance Chemical Vapor Deposition) method, the carbon film can be produced by changing the type of the reaction gas (gas containing carbon) supplied into the deposition apparatus and controlling the substrate bias.

The protrusion may comprise a carbon film having a hydrogen content of 0 atomic %. An example of such a carbon film comprises cathodic arc carbon (CAC).

By decreasing the hydrogen content of the carbon film which constitutes the protrusion, bonding of carbon atoms can be strengthened to increase hardness.

In the magnetic head slider of the present invention having the above construction, the rail and/or pad may comprise side rails and/or pads which are formed on both marginal sides of the medium-facing surface on the magnetic disk side of the slider body to extend from the air flow inlet side to the air flow outlet side of the slider body, and the protrusion having a hardness of 22 GPa or more may be formed on the air flow inlet side and the air flow outlet side of the side rail and/or pad.

In the magnetic head slider of the present invention having the above construction, the rail and/or pad may comprise side rails which are formed on both marginal sides of the medium-facing surface on the magnetic disk side of the slider body to extend from the air flow inlet side to the air flow outlet side of the slider body, and a center rail formed between the side rails, and the protrusion having a hardness of 22 GPa or more may be formed at least on the air flow inlet side of the side rails.

The magnetic head slider of the present invention having the above construction may comprise a plurality of the rails and/or pads which are provided in the direction from the air flow inlet side to the air flow outlet side of the slider body.

In the magnetic head slider of the present invention having the above construction, the rail preferably comprises a crown which is formed thereon so that a magnetic gap provided on the slider body can be brought nearer to the magnetic disk.

In the magnetic head slider of the present invention having the above construction, the magnetic head core preferably comprises a giant magnetoresistive element.

In accordance with a third aspect of the present invention, there is provided a magnetic head slider comprising a magnetic head core provided in a plate-shaped slider body, and a rail formed on the medium-facing surface on the magnetic disk side of the slider body, for producing buoyant force so that the slider flies and moves above a magnetic disk to write or read magnetic information, wherein a plurality of protrusions are provided on at least the rail among the medium-facing surface and the rail of the slider body along the length direction of the slider body, and one of the plurality of protrusions, which is nearest to the magnetic head core, is lower than the other protrusions.

In the magnetic head slider of the present invention having the above construction, the protrusion lower than the other protrusions is interposed between the medium-facing surface of the slider body and the magnetic disk in the portion near the magnetic head core side (the air flow outlet side) when the magnetic disk is stopped. Therefore, a meniscus of a lubricant coated on the surface of the magnetic disk has a large radius around the lower protrusion to prevent adhesion of the medium-facing surface of the slider body to the magnetic disk due to the liquid film of the lubricant, thereby improving the effect of decreasing adhesion between the slider body and the magnetic disk. Since the protrusion nearest to the magnetic head core is lower than the other protrusions so that the protrusion nearest to the magnetic head core can be prevented from projecting from the magnetic gap to the magnetic disk side during flying of the magnetic head slider at a pitch angle of about 100 μRad. Namely, it is advantageous that the magnetic gap can be brought nearer to the magnetic disk than the plurality of the protrusions.

In the magnetic head slider of the present invention having the above construction, the heights of the plurality of the protrusions may be gradually decreased in the direction from the air flow inlet side to the air flow outlet side of the slider body.

In the magnetic head slider of the present invention having the above construction, the rail may comprise side rails which are formed on both marginal sides of the medium-facing surface on the magnetic disk side of the slider body to extent from the air flow inlet side to the air flow outlet side of the slider body, and the plurality of the protrusions may be provided along the length direction of each the side rail.

The magnetic head slider of the present invention having the above construction may further comprise a groove provided between the side rails of the slider body so that the plurality of the protrusions may be provided on each of the side rails and in the groove.

In the magnetic head slider of the present invention having the above construction, the end (lower end) of at least the protrusion of the plurality of the protrusions, which is nearest to the magnetic head core, is preferably higher than the magnetic gap of the magnetic head core. Namely, the distance between the magnetic disk and the end of at least the protrusion of the plurality of the protrusions, which is nearest to the magnetic head core, is preferably larger than the distance between the magnetic gap of the magnetic head core and the magnetic disk.

In the magnetic head slider having the above construction, in flying of the magnetic head slider, the magnetic gap can be advantageously brought nearer to the magnetic disk than the plurality of the protrusions, and contact between the ends of the protrusions and the magnetic disk can be prevented.

In the magnetic head slider of the present invention having the above construction, in the flying state of the magnetic head slider, the protrusion nearest to the magnetic head core preferably does not project to the magnetic disk side from the line connecting the other protrusions and the magnetic gap of the magnetic head core.

In the magnetic head slider having the above construction, in flying of the magnetic head slider, the magnetic gap can be advantageously brought nearer to the magnetic disk than the plurality of the protrusions, and contact between the ends of the protrusions and the magnetic disk can be prevented.

In the magnetic head slider of the present invention having the above construction, the distance between the magnetic gap and the protrusion nearest to the magnetic head core is preferably 25% or less of the length of the slider body.

In the magnetic head slider having the above construction, the lower protrusion is interposed between the medium-facing surface of the slider body and the magnetic disk in the portion near the magnetic gap when the magnetic disk is stopped, and the distance between the protrusion and the magnetic gap is small. Therefore, the effect of preventing adhesion of the medium-facing surface of the slider body to the magnetic disk due to the liquid film of the lubricant can be improved to exhibit the excellent effect of preventing adhesion between the slider body and the magnetic disk.

In the magnetic head slider of the present invention having the above construction, at least the outermost layer of each of the protrusions preferably comprises a carbon film having a film hardness of 22 GPa or more to improve the abrasion resistance of the protrusions, and prevent wear of the protrusions during sliding on the magnetic disk when the magnetic disk is started and stopped.

In the magnetic head slider of the present invention having the above construction, the magnetic head core preferably comprises a giant magnetoresistive element.

The method of manufacturing the magnetic head slider according to the third aspect of the present invention comprises alternately laminating an intermediate film and a carbon film on the medium-facing surface on the magnetic disk side of the plate-shaped slider body comprising the magnetic head core to form a multilayer film, and patterning the multilayer film to form a plurality of protrusions, wherein of the plurality of protrusions, the protrusion nearest to the magnetic head core is lower than the other protrusions.

The method of manufacturing the magnetic head slider having the above construction can be preferably used for manufacturing the magnetic head slider of the present invention.

DESCRIPTION OF THE PREFERRED EMBODIMENTS

A magnetic head slider according to a first embodiment of the present invention will be described below with reference to the drawings.

Figure 1:
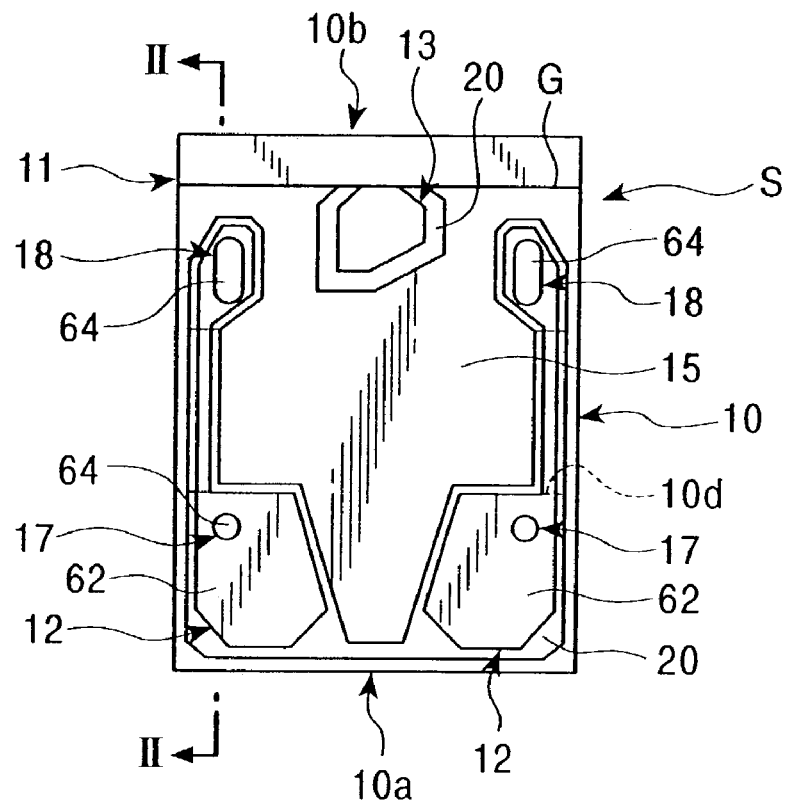
FIG. 1 is a bottom view of a magnetic head slider in accordance with a first embodiment of the present invention.
Figure 2:
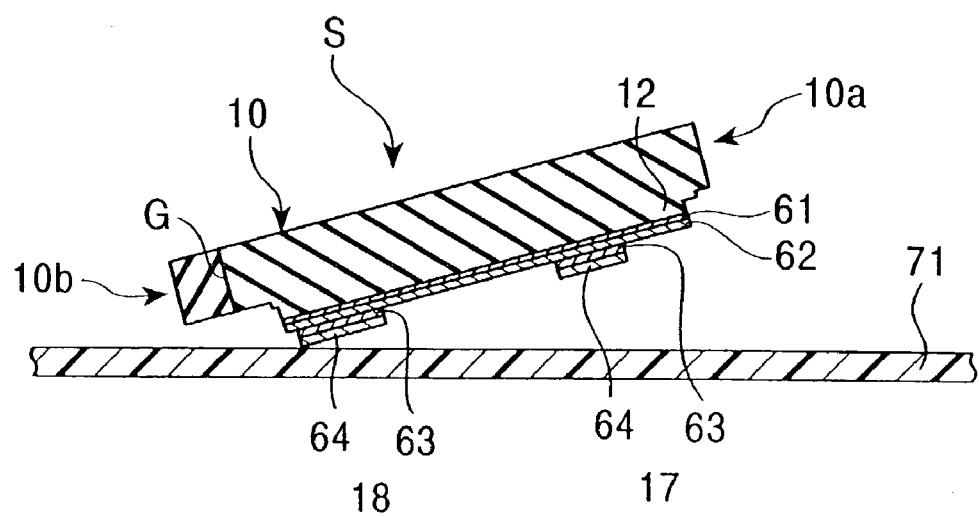
FIG. 2 is a sectional view taken along line II—II of FIG. 1 showing the flying state of the magnetic head slider.

FIG. 1 is a bottom view of the magnetic head slider of this embodiment of the present invention, and FIG. 2 is a sectional view of the magnetic head slider in a flying state taken along line II—II in FIG. 1.

Figure 27:
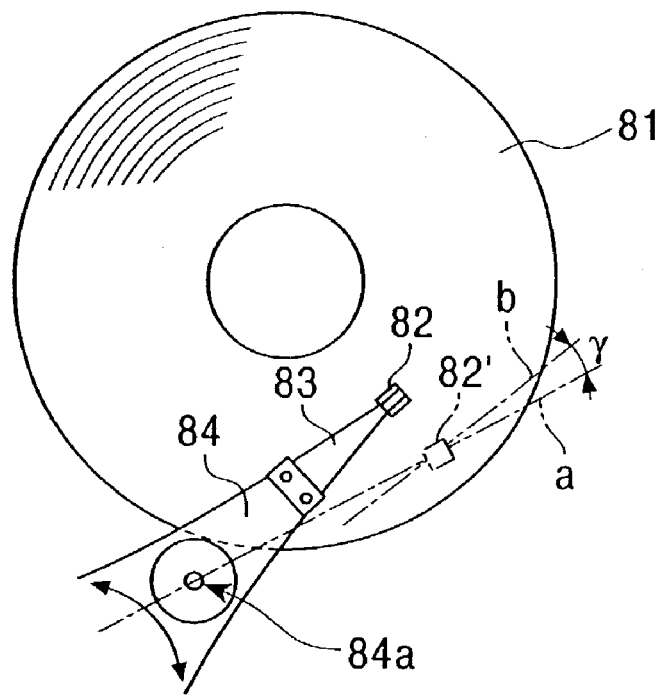
FIG. 27 is a drawing showing the arrangement relation between a conventional magnetic head slider and a magnetic disk.
Figure 28:
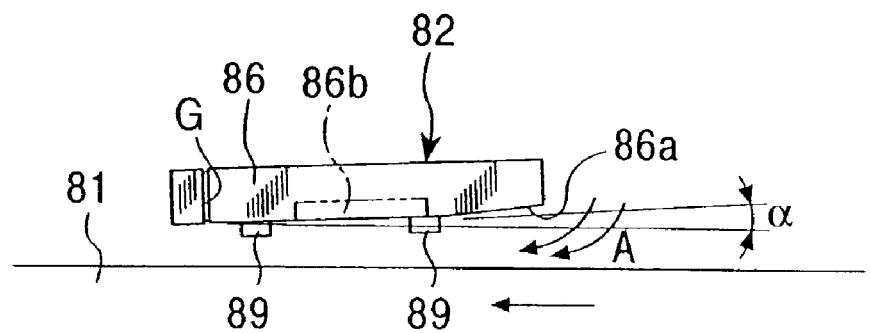
FIG. 28 is a side view showing the state in which an example of conventional magnetic head sliders flies and moves.
Figure 29:
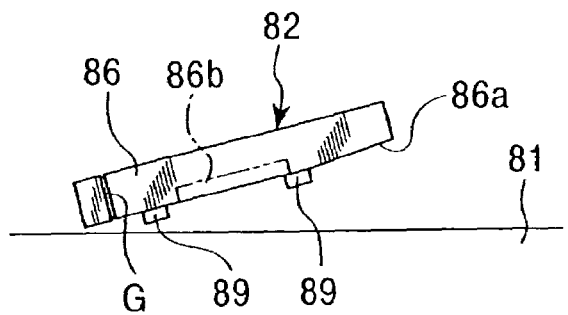
FIG. 29 is a side view showing the static state of a conventional magnetic head slider.
Figure 30:
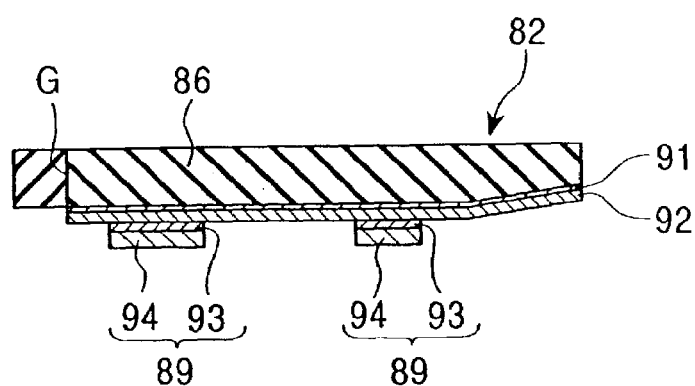
FIG. 30 is an enlarged sectional view of a conventional magnetic head slider taken along the length direction of a side rail.
Figure 31:
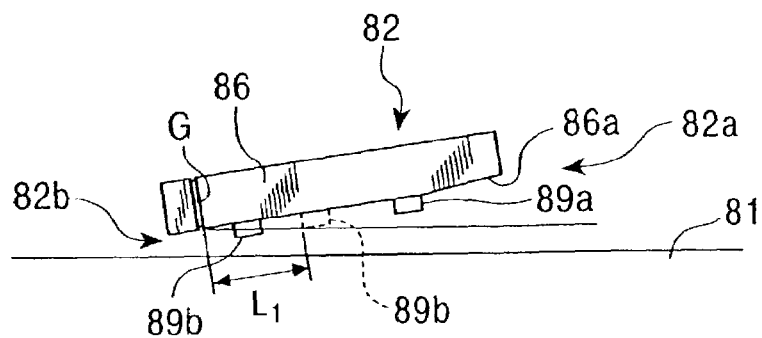
FIG. 31 is a side view showing the static state of another example of conventional magnetic head sliders.

The magnetic head slider S of this embodiment comprises a plate-shaped slider body 10 composed of $Al_2O_3TiC$ or the like, and a magnetic head core 11 having the construction which will be described below. The whole portion except the magnetic core comprises a ceramic substrate, and is used in the same manner as the conventional magnetic head slider shown in FIG. 27.

In the slider body 10, two side rails 12 are formed at both side edges of the bottom thereof (the surface shown in FIG. 1, which is the medium-facing surface facing a magnetic disk 71) so as to extend from the front side to the rear side of the slider body 10.

The lower side of the slider body 10 shown in FIG. 1 is referred to as "the front side" of the slider body 10, which is generally referred to as "the leading side" 10a of the slider in which an air flow flows from the magnetic disk 71. In contrast, the upper side of the slider body 10 shown in FIG. 1 is referred to as "the rear side" of the slider body 10, which is generally referred to as "the trailing side" 10b of the slider from which an air flow from the magnetic disk 71 flows out.

Each of the side rails 12 is provided for generating positive pressure, and comprises the air flow inlet side end having a larger width than the air flow outlet side end, and a narrow central portion formed between the inlet side end and the outlet side end. Each of the side rails 12 has a notched portion 10d formed in the central portion thereof, as shown by a chain line inn FIG. 1.

Also, an island-like center rail 13 is formed between the rear ends of both side rails 12. Each of the side rails 12 and the center rail 13 preferably comprises a crown formed on the surface thereof, and a step 20 formed in the periphery thereof. The slider body 10 further comprises a negative pressure groove 15 formed at the bottom thereof so as to be held between both side rails 12. The negative pressure groove 15 comprises the front end portion gradually widening from the front side to the central portion, and the rear end portion divided into two parts narrower than the central portion by the center rail 13.

As shown in FIG. 2, a first carbon film 61 having corrosion resistance is provided on the surfaces of both side rails 12 and the center rail 13 through an adhesive layer 61 made of Si, SiC, or the like. The first carbon film 62 preferably contains 30 atomic % or more, more preferably 35 atomic % or more, of hydrogen. With the first carbon film 62 having a hydrogen content of less than 30 atomic %, the corrosion resistance deteriorates, and thus the magnetic head core 11 provided on the slider body 10 easily deteriorates due to corrosion.

The thickness of the adhesive layer 61 is about 0.5 nm, and the thickness of the first carbon film 62 is about 4.5 nm.

Each of the side rails 12 has first and second protrusions 17 and 18 formed thereon through the adhesive layer 61 and the first carbon film 62. The first protrusion 17 is provided on the air flow inlet side, and the second protrusion 18 is provided on the air flow outlet side. Each of the first and second protrusions 17 and 18 comprises an intermediate film 63 of Si, SiC, or the like, and a second carbon film 64, which are alternately formed thereon (in FIG. 1, one layer each of the intermediate film 63 and the second carbon film 64 is formed). The intermediate film 63 is provided on the first carbon film side and functions as an etching stopper in formation of the protrusions.

The second carbon film 64 formed in the outermost surface of each of the protrusions 17 and 18 has abrasion resistance, and comprises a carbon film having a film hardness of 22 GPa or more.

Figure 5:
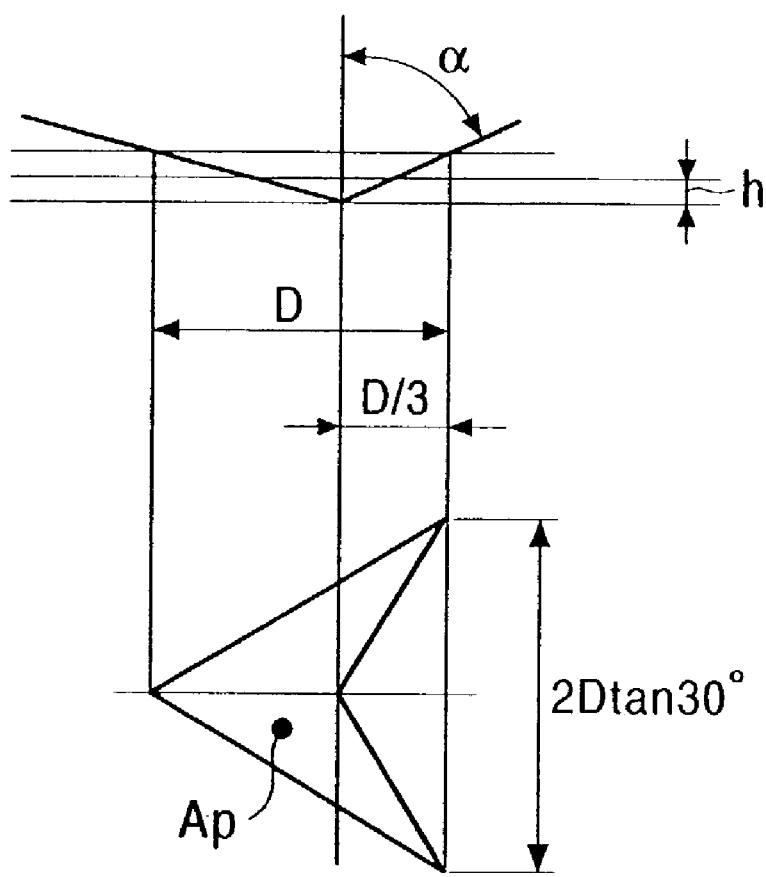
FIG. 5 is a drawing showing the shape of an indenter used for measuring the film hardness of a second carbon film.

The film hardness is determined by measuring a penetration depth with a load using a penetration hardness testing machine, and determining according to the following equation (1). As a measurement indenter provided on the penetration hardness testing machine, a diamond triangular pyramid indenter having an open angle ($\alpha$) of 65° was used, as shown in FIG. 5. In FIG. 5, Ap denotes a projected area.

$$\text{Film hardness} = P/As = 37.962 \times 10^{-3} \times P/h^2 \qquad (1)$$

(wherein P represents the load, h represents the penetration depth, and As represents the surface area of the triangular pyramid indenter with displacement h).

As the carbon film having a film hardness 22 GPa or more, a carbon film having a hydrogen content of less than 30 atomic % is used, a carbon film having a hydrogen content of 27 atomic % is preferably used, and a cathodic arc carbon (CAC) film having a hydrogen content of 0 atomic % is more preferably used.

The first protrusion 17 has a circular cross-sectional shape, and the second protrusion 18 has an elliptic cross-sectional shape, and is formed so that the long axis is arranged in the length direction of the side rails 12.

Where the flying amount of the magnetic head slider S is 25 nm, and the distance between the second protrusions 18 and the magnetic gap G is 300 μm, the height of each of the first and second protrusions 17 and 18 is 35 nm or more. However, when the protrusions 18 nearer to the magnetic head core 11 are excessively high, the protrusions 18 come nearer to the magnetic disk 71 than the magnetic gap G during flying because the slider body 10 is inclined at about 100 μRad in flying. Namely, the distance between the magnetic gap G and the magnetic disk 71 unfavorably becomes larger than the distance between the protrusions 18 and the magnetic disk 71. The intermediate film 62 which constitutes each of the first and second protrusions 17 and 18 has a thickness of about 4 nm, and the second carbon film 64 having abrasion resistance has a thickness of about 31 nm.

Each of the first and second protrusions 17 and 18 preferably has a crown formed on the surface thereof.

Next, the structure of the magnetic head core 11 formed at the center of the rear end of the slider body 10 will be described.

Figure 3:
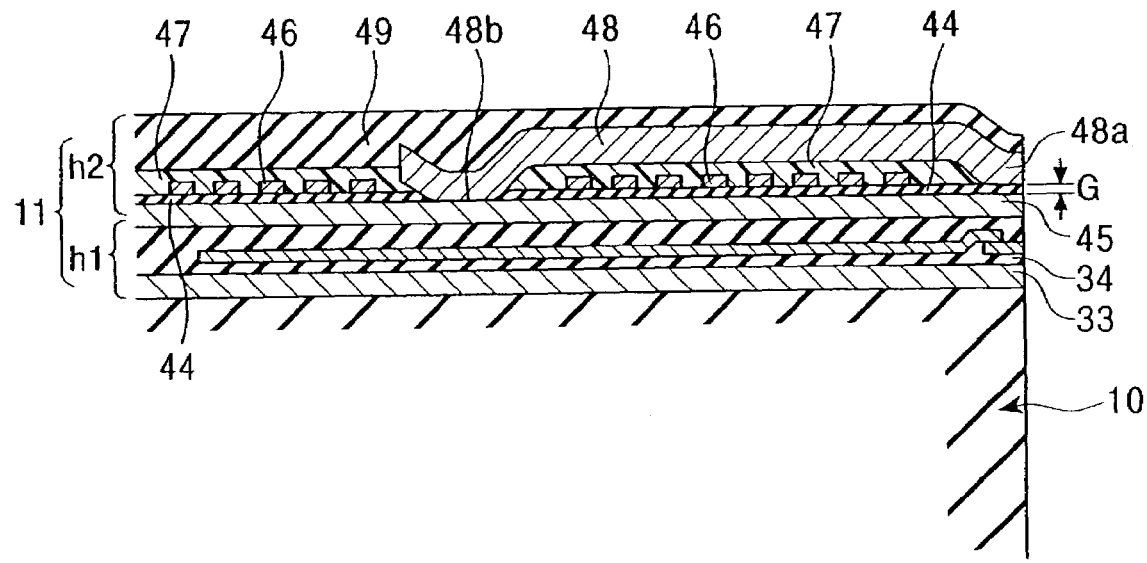
FIG. 3 is s sectional view showing an example of a magnetic head core provided on a magnetic head slider of the present invention.
Figure 4:
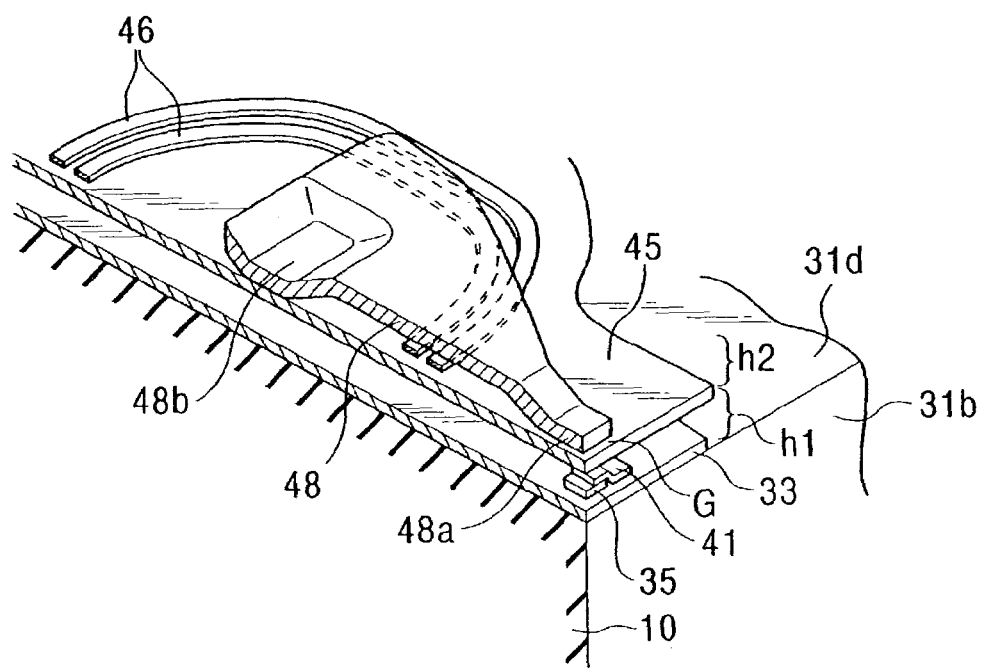
FIG. 4 is a partial sectional view showing an example of a magnetic head core provided on a magnetic head slider of the present invention.

The magnetic head core 11 of this embodiment is a combination type magnetic head core having the sectional structure shown in FIGS. 3 and 4, comprising a MR head (reading head) h1 and an inductive head (writing head) h2 which are laminated in turn on the rear end surface of the slider body 10.

The MR head h1 detects a leakage magnetic flux from the recording medium such as a disk or the like by using a magnetoresistive effect to read a magnetic signal.

As shown in FIGS. 3 and 4, the MR head h1 comprises a lower shield layer 33 made of a magnetic alloy such as sendust (Fe—Al—Si) and formed at the rear end of the slider body 10, a lower gap layer 34 formed on the lower shield layer 33 and made of a nonmagnetic material such as alumina ($Al_2O_3$) or the like, and a giant magnetoresistive material film (giant magnetoresistive element) 35 laminated on the lower gap layer 34.

In addition, hard bias layers for applying a bias magnetic field to the giant magnetoresistive material film 35, and electrode layers 41 for supplying a sensing current are formed on both sides of the giant magnetoresistive material film 35. Furthermore, an upper gap layer is formed on these layers, and an upper shield layer is formed on the upper gap layer. The upper shield layer is also used as a lower core layer 45 of the inductive head h2 provided thereon.

The inductive head h2 comprises a gap layer 44 formed on the lower core layer 45, a coil layer 46 formed on the gap layer 44 to have a spiral planar pattern, the coil layer 46 being surrounded by an insulating material layer 47. Furthermore, an upper core layer 48 is formed on the insulating material layer 47 so that the front end 48a thereof is opposed to the lower core layer 45 with a small gap therebetween in the ABS 31b, and the base end 48b is magnetically connected to the lower core layer 45. A protecting layer 49 made of alumina or the like is provided on the upper core layer 48.

In the inductive head h2, when a recording current is supplied to the coil layer 46, a recording magnetic field is applied to the core layer from the coil layer 46. Therefore, a magnetic signal can be recorded on the magnetic recording medium such as a magnetic disk or the like by means of a leakage magnetic field from the magnetic gap G between the lower core layer 45 and the front end of the upper core layer 48.

The giant magnetoresistive material film 35 comprises a laminate having a trapezoidal sectional shape and formed by laminating a free ferromagnetic layer, a nonmagnetic layer, a pinned magnetic layer and an antiferromagnetic layer.

Each of the free ferromagnetic layer and the pinned magnetic layer comprises a thin film of a ferromagnetic material. Examples of the ferromagnetic material include a Ni—Fe alloy, a Co—Fe alloy, a Ni—Co alloy, Co, a Ni—Fe—Co alloy, and the like. The free ferromagnetic layer may comprise a Co layer, a Ni—Fe alloy, a laminated structure of a Co layer and Ni—Fe alloy layer, or a laminated structure of a Co—Fe alloy layer and a Ni—Fe alloy layer. In a two-layer structure comprising a Co layer and a Ni—Fe alloy layer, a thin Co layer is preferably provided on the nonmagnetic layer side. In a two-layer structure comprising a Co—Fe alloy layer and a Ni—Fe alloy layer, the thin Co—Fe alloy layer is preferably arranged on the nonmagnetic layer side.

This is because in a giant magnetoresistive effect generating mechanism having a structure in which the nonmagnetic layer is held between the free ferromagnetic layer and the pinned ferromagnetic layer, the great effect of conduction electron spin-dependent scattering is produced in the Co—Cu interface, and the free ferromagnetic layer and the pinned ferromagnetic layer, which are made of the same material, have the lower possibility of producing a factor other than conduction electron spin-dependent scattering than the layers made of different materials, thereby obtaining the greater magnetoresistive effect. Therefore, with the pinned ferromagnetic layer made of Co, the free ferromagnetic layer preferably has a structure in which the nonmagnetic layer side is replaced by a Co layer having a predetermined thickness. Alternatively, the free ferromagnetic layer may comprise a concentration gradient layer in which the nonmagnetic layer side is put into an alloy state containing much Co so that the Co concentration gradually decreases to the nonmagnetic layer side, without the distinct Co layer provided.

Also, in a structure in which each of the free ferromagnetic layer and the pinned ferromagnetic layer comprises a Co—Fe alloy layer, and the nonmagnetic layer is held between the free ferromagnetic layer and the pinned ferromagnetic layer, the great effect of conduction electron spin-dependent scattering is exhibited in the interface between the Co—Fe alloy layer and a Cu layer, and the probability of producing a factor other than conduction electron spin-dependent scattering is low, thereby obtaining the higher magnetoresistive effect.

The nonmagnetic layer comprises a nonmagnetic material such as Cu, Cr, Au, Ag, or the like, and has a thickness of about 2 to 4 nm.

The antiferromagnetic layer is preferably made of, for example, a $X_1$—Mn alloy. In this composition formula, $X_1$ is preferably at least one of Ru, Rh, Ir, Pd, and Pt.

In a case in which $X_1$ of the $X_1$—Mn alloy is a single metal atom, the $X_1$ content is preferably in the range of 10 to 45 atomic % of Ru, 10 to 40 atomic % of Rh, 10 to 40 atomic % of Ir, 10 to 25 atomic % or Pd, or 10 to 25 atomic % of Pt. In the above description, "10 to 45 atomic %" means not less than 10 atomic %, and not more than 45 atomic %, and the upper and lower limits of the numerical range are defined as "not more than" and "not less than", respectively.

A Mn system alloy in the above composition range has a disordered crystal structure. The disordered crystal structure means a state different from an ordered crystal structure such as a face centered tetragonal crystal (fct ordered lattice; the CuAuI structure, or the like). Namely, the Mn alloy used is not heated at high temperature for a long time for forming the ordered crystal structure (CuAuI structure or the like) such as the face centered tetragonal crystal after being deposited by sputtering. The disordered crystal structure assumes the as-deposited state after deposition by sputtering or the like, or the annealed state after deposition.

In the $X_1$—Mn alloy (element $X_1$ is at least one of Ru, Rh, Ir, Pd, and Pt), the $X_1$ content is more preferably 37 to 63 atomic %. In the above description, "37 to 63 atomic %" means not less than 37 atomic %, and not more than 63 atomic %, and the upper and lower limits of the numerical range are defined as "not more than" and "not less than", respectively.

The layer of the $X_1$—Mn alloy in the above composition range formed by a deposition method such as sputtering or the like has a face centered tetragonal lattice with a disordered Mn atom sequence, and produces less exchange anisotropic magnetic field in the interface with the ferromagnetic layer. However, the disordered lattice structure is transformed to a face centered tetragonal lattice by annealing in a magnetic field so that a large exchange anisotropic magnetic field (Hex) having unidirectional anisotropy can be produced in the interface with the ferromagnetic layer.

The antiferromagnetic layer may comprise a $X_1$—Mn—$X_2$ alloy. In this composition formula, $X_1$ is preferably at least one of Ru, Rh, Ir, Pd, and Pt, as described above, and $X_2$ is preferably at least one of Ag, Mg, Al, Si, P, Be, B, C, Ti, V, Cr, Fe, Co, Ni, Cu, Zn, Ga, Ge, Y, Zn, Nb, Mo, Hf, Ta, W, Sn, and In. The composition ratio of $X_1$ to Mn is $X_1$:Mn=4:6 to 6:4 by atomic %. The $X_2$ content is 0.2 to 10 atomic %.

The antiferromagnetic layer comprising the $X_1$—Mn—$X_2$ alloy, which is annealed in a magnetic field after deposition, can also produce a large exchange anisotropic magnetic field (Hex) with unidirectional anisotropy in the interface with the ferromagnetic layer.

The antiferromagnetic layer comprising the $X_1$—Mn alloy or the $X_1$—Mn—$X_2$ alloy can apply the exchange anisotropic magnetic field having unidirectional anisotropy in the interface with the pinned ferromagnetic layer to pin the magnetization rotation of the pinned ferromagnetic layer with an external signal magnetic field.

The antiferromagnetic layer comprising the $X_1$—Mn alloy exhibits excellent corrosion resistance and less variation in the exchange anisotropic magnetic field (Hex) with a temperature change, as compared with Fe—Mn.

In the MR head h1 having the above construction, the electric resistance of the giant magnetoresistive material film 35 changes with a small leakage magnetic field from the magnetic disk 71 so that the recording contents of the magnetic disk 71 can be read by reading the change in resistance.

In manufacturing the magnetic head slider S having the above-described construction, a plurality of the magnetic head cores 11 are formed on a plate (wafer) made of, for example, $Al_2O_3TiC$, and then the plate is cut into a plurality of substrates. In forming a crown on each of the side rails 12 and the center rail 13, the surfaces of the substrates are lapped.

Figure 6A:
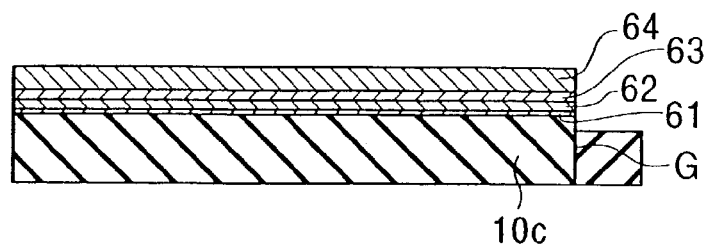
FIGS. 6A–6F are drawings showing the steps of the method of manufacturing the magnetic head slider shown in FIGS. 1 and 2.

Then, as shown in FIG. 6A, the adhesive layer 61 of Si or SiC is formed on the surface (serving as the medium-facing surface on the magnetic disk side) of the substrate 10c by the sputtering or CVD method. Then, the first carbon film 62 is formed by the ECRCVD (Electron Cyclotron Resonance Chemical Vapor Deposition) method in which the type of the reaction gas (gas containing carbon) supplied into the deposition apparatus is changed, and the substrate bias is controlled (decreased). By using methane gas as the reaction gas, the carbon film having a hydrogen content of 35 atomic % or more can be deposited. By using ethylene gas as the reaction gas, the carbon film having a hydrogen content of over 30 atomic % can be deposited by controlling the substrate bias.

In this way, the first carbon film 62 having a hydrogen content of 30 atomic % or more is formed on the surface (the medium-facing surface on the magnetic disk side) of the substrate 10c to increase compactness due to the formation of an amorphous phase, while the film hardness is decreased. As a result, the carbon film having a high degree of adhesion and causing less peeling can be obtained.

Then, the intermediate film 63 of Si or SiC is formed on the surface of the first carbon film 62 by the sputtering or CVD method. Then the second carbon film 64 having a film hardness of 22 GPa or more is formed on the intermediate film 63 by the ECRCVD method in which the type of the reaction gas (gas containing carbon) supplied into the deposition apparatus is changed, and the substrate bias is controlled (increased) to decrease the hydrogen content of the carbon film to less than 30 atomic %.

When the second carbon film 64 comprises cathodic arc carbon, the second carbon film 64 is deposited by arc discharge of a graphite block in a vacuum atmosphere in the deposition apparatus in which the substrate 10c having the adhesive layer 61, the first carbon film 62 and the intermediate film 63 formed thereon is arranged.

Figure 6B:
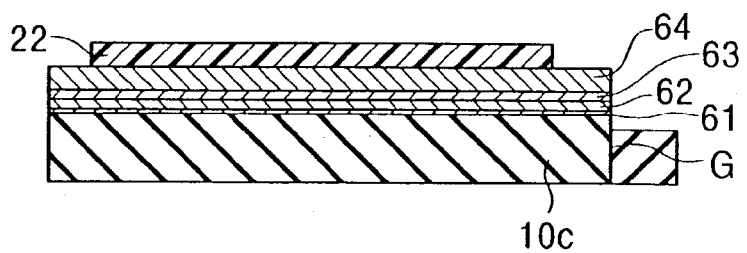

Then, a first resist is coated on the second carbon film 64, and then exposed and developed to form the stripe resist patter 22 shown in FIG. 6B. The resist pattern 22 covers the region in which the side rails 12 and the center rail 13 are formed.

Figure 6C:
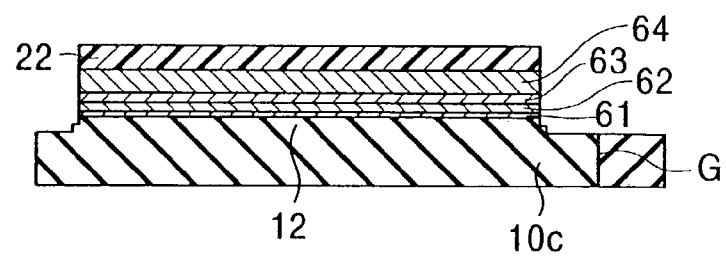

Then, the portions of the second carbon film 64, the intermediate film 63, the first carbon film 62, the adhesive layer 61 and the substrate 10c, which are not covered with the resist pattern 22, are successively etched out by ion milling, as shown in FIG. 6C. As a result, the side rails 12 and the center rail 13 are formed. At the same time, the negative pressure groove 15 is formed between the side rails 12, and division grooves (not shown) for dividing into sliders are formed. Then, the resist pattern 22 is removed.

Figure 6D:
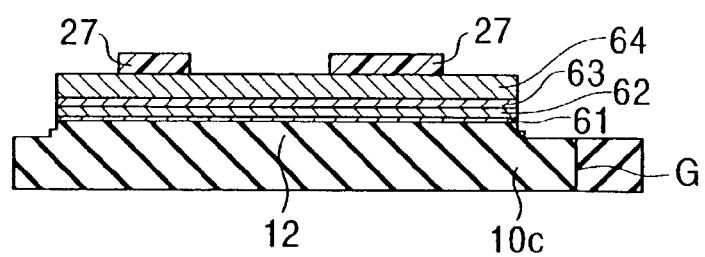

Next, a second resist is coated on the second carbon film 64, and exposed and developed to form a resist pattern 27 having the same pattern as the first and second protrusions 17 and 18 at the predetermined positions of the side rails 12, as shown in FIG. 6D.

Figure 6E:
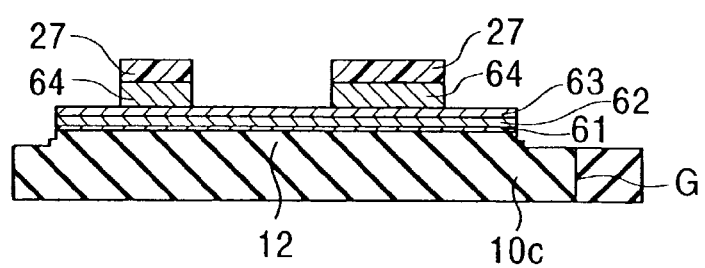

The portions of the second carbon film 64, which are not covered with the resist pattern 27, are etched out by oxygen plasma etching. In this processing, the intermediate film 63 located below the second carbon film 64 functions as an etching stopper so that the only the second carbon film 64 is etched, while the intermediate film 63 is not etched, as shown in FIG. 6E.

Figure 6F:
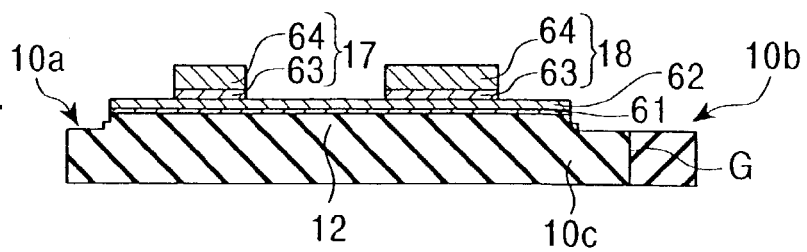

Then, the portions of the intermediate film 63, which are not covered with the resist pattern 27, are etched out by $CF_4$ plasma etching, and then the resist pattern 27 is removed to form the first and second protrusions 17 and 18, as shown in FIG. 6F. In this processing, only the intermediate film 63 is etched, while the first carbon film 62 located below the intermediate film 63 is not etched.

Then, the first and second protrusions 17 and 18 may be lapped to form the crowns.

Then, the substrate 10c is divided along the division grooves to obtain the magnetic head slider S shown in FIGS. 1 and 2.

The magnetic head slider S having the above construction flies and moves above the magnetic disk 71 by CSS operation to write and read magnetic information according to demand.

Therefore, with the magnetic disk 71 stopped, the magnetic head slider S is stopped in a state in which the surface of the second protrusion 18 provided on each of the side rails 12 is lightly pressed on the surface of the magnetic disk 71 by the urging force of a spring plate provided on the slider S, as shown in FIG. 2.

When rotation of the magnetic disk 71 is started in this state, an air flow is produced on the surface of the magnetic disk, and flows to the bottom side of the slider body 10. At the same time, lifting is produced at the air flow inlet side end of each of the side rails 12 due to the generation of the air flow, and the slider body 10 starts to float when the lifting becomes a magnitude sufficient to overcome the urging force of the spring plate. The air which passes through the air flow inlet side end of each side rail 12 and flows to the bottom side of the slider body 10, and the air which passes between the side rails 12 flow into the negative pressure groove 15 to produce large negative pressure. Therefore, the slider body 10 is inclined at the predetermined pitch angle with the air flow inlet side end inclined upward.

In the magnetic head slider S of this embodiment, the second carbon film 64 with abrasion resistance is formed on the outermost surface of each of the first and second protrusions 17 and 18, and thus the protrusions 17 and 18 are less worn during sliding on the magnetic disk 71 when the magnetic disk 71 is stared and stopped, thereby significantly improving the abrasion resistance of the protrusions. In addition, the surface of each of the side rails 12 and the center rail 13 of the slider body 10 is covered with the first carbon film 62 having corrosion resistance, thereby preventing corrosive deterioration of the magnetic core 11 provided on the slider body 10.

Furthermore, the abrasion resistance of the first and second protrusions 17 and 18 is significantly improved to prevent an increase in the area of contact between the slider and the magnetic disk. Also, the magnetic head element 35 provided on the magnetic head core 11 and the recording layer of the magnetic disk 71 can be prevented from being damaged due to an increase in adhesion force between the slider and the magnetic disk when rotation of the magnetic disk is started.

Furthermore, in forming the first and second carbon films 62 and 64 having the above properties by the ECRCVD method, the reaction gas (gas containing carbon) supplied to the deposition apparatus is changed, and the substrate bias is controlled to efficiently produce carbon films having different properties.

Therefore, in the magnetic head slider S of this embodiment, the abrasion resistance of the first and second protrusions 17 and 18 provided on the medium-facing surface and the side rails 12 of the slider body 10 can be improved while the manufacturing efficiency is maintained high, and corrosion of the magnetic head core 11 provided on the slider body 10 can be prevented.

Although, in this embodiment, the first carbon film 62 is formed on the surface of each of the side rails 12 and the center rail 13 through the adhesive layer 61, the first carbon film 62 having corrosion resistance may also be formed, through the adhesive layer 61, on portions of the medium-facing surface of the slider body 10 besides the rails. In this case, the effect of preventing corrosion of the magnetic head core 11 can be further improved.

Although, in this embodiment, each of the protrusions 17 and 18 comprises one layer each of the intermediate film 63 and the second carbon film 64, each of the protrusions may comprise a multilayer film (comprising 4 layers or more) in which the intermediate film 63 and the second carbon film 64 are alternately laminated. In this case, at least the outermost second carbon film 64 preferably has abrasion resistance.

A magnetic head slider according to a second embodiment of the present invention will be described with reference to the drawings.

Figure 7:
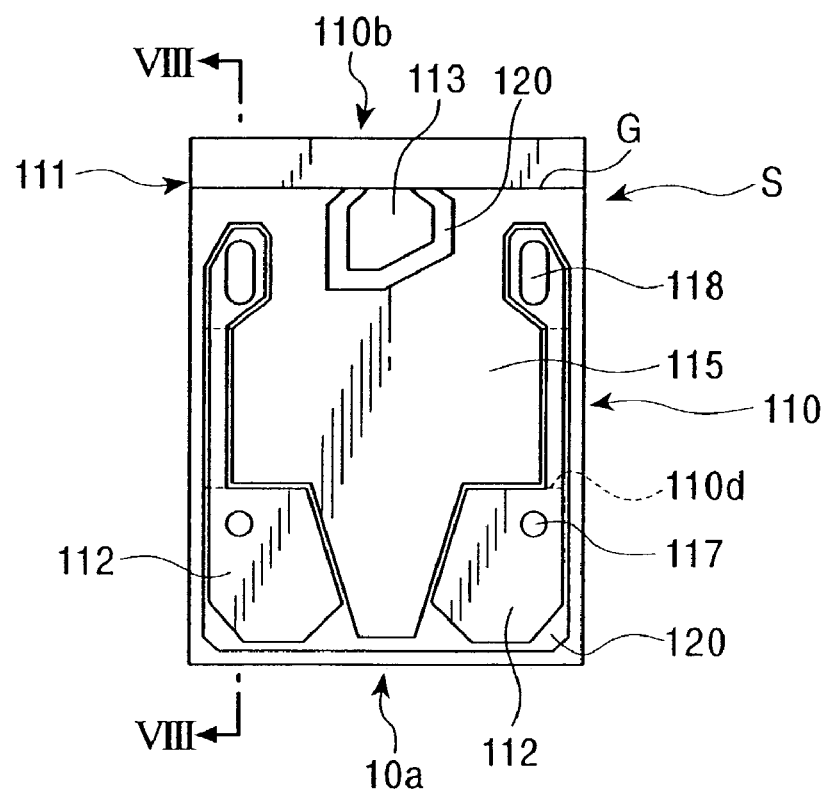
FIG. 7 is a bottom view of a magnetic head slider in accordance with a second embodiment of the present invention.
Figure 8:
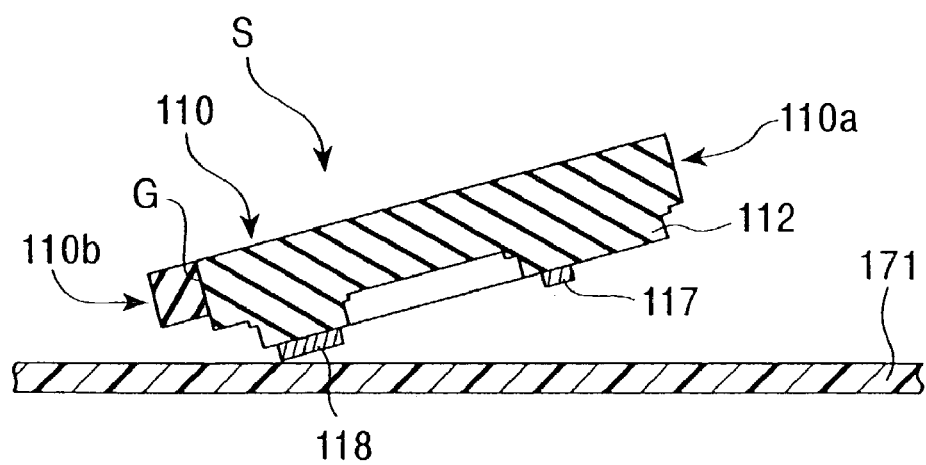
FIG. 8 is a sectional view taken along line VIII—VIII of FIG. 7 showing the static state of the magnetic head slider.

FIG. 7 is a bottom view illustrating the magnetic head slider according to the second embodiment of the present invention, and FIG. 8 is a sectional view of the magnetic head slider in a static state taken along line VIII—VIII in FIG. 7.

The magnetic head slider S of the second embodiment comprises a plate-shaped slider body 110 composed of $Al_2O_3TiC$ or the like, and a magnetic head core 111 having the construction which will be described below. The whole portion except the magnetic core comprises a ceramic substrate, and is used in the same manner as the conventional magnetic head slider shown in FIG. 27.

In the slider body 110, two side rails 112 are formed at both side edges of the bottom thereof (the surface shown in FIG. 1, which is the medium-facing surface facing a magnetic disk 171) so as to extend from the front side to the rear side of the slider body 110.

The lower side of the slider body 110 shown in FIG. 7 is referred to as "the front side" of the slider body 110, which is generally referred to as "the leading side" 110*a* of the slider in which an air flow flows from the magnetic disk 171. In contrast, the upper side of the slider body 110 shown in FIG. 7 is referred to as "the rear side" of the slider body 110, which is generally referred to as "the trailing side" 110*b* of the slider from which an air flow from the magnetic disk 71 flows out.

Each of the side rails 112 is provided for generating positive pressure, and comprises the air flow inlet side end having a larger width than the air flow-outlet side end, and a narrow central portion formed between the inlet side end and the outlet side end. Each of the side rails 112 has a notched portion 110*d* formed in the central portion thereof, as shown by a chain line inn FIG. 7.

Also, a center rail 113 is formed between the rear ends of both side rails 112. Each of the side rails 112 and the center rail 113 preferably comprises a crown formed on the surface thereof, and a step 20 formed in the periphery thereof. The slider body 110 further comprises a negative pressure groove 115 formed at the bottom thereof so as to be held between both side rails 112. The negative pressure groove 115 comprises the front end portion which gradually widening from the front side to the central portion, and the rear end portion which is divided into two parts narrower than the central portion by the center rail 113.

Each of the side rails 112 has a first protrusion 117 formed on the air flow inlet side, and a second protrusion 118 formed on the air flow outlet side. Each of the first and second protrusions 117 and 118 comprises a material having a film hardness of 22 GPa or more and excellent abrasion resistance.

As the material having a film hardness 22 GPa or more, a carbon film having a hydrogen content of less than 43 atomic % is used, a carbon film having a hydrogen content of 30 atomic % is preferably used, and a cathodic arc carbon (CAC) film having a hydrogen content of 0 atomic % is more preferably used.

The first protrusion 117 has a circular cross-sectional shape, and the second protrusion 118 has an elliptic cross-sectional shape, and is formed so that the long axis is arranged in the length direction of the side rails 112.

Where the flying amount of the magnetic head slider S is 25 nm, and the distance between the second protrusions 118 and the magnetic gap G is 300 μm, the height of each of the first and second protrusions 117 and 118 is 7 μm or more. However, when the protrusions 118 nearer to the magnetic head core 111 are excessively high, the protrusions 118 come nearer to the magnetic disk 171 than the magnetic gap G in flying because the slider body 110 is inclined at about 100 μRad in flying. Namely, the distance between the magnetic gap G and the magnetic disk 117 unfavorably becomes larger than the distance between the protrusions 118 and the magnetic disk 117.

Each of the first and second protrusions 117 and 118 preferably has a crown formed on the surface thereof.

Next, the structure of the magnetic head core 111 formed at the center of the rear end of the slider body 110 will be described.

Figure 9:
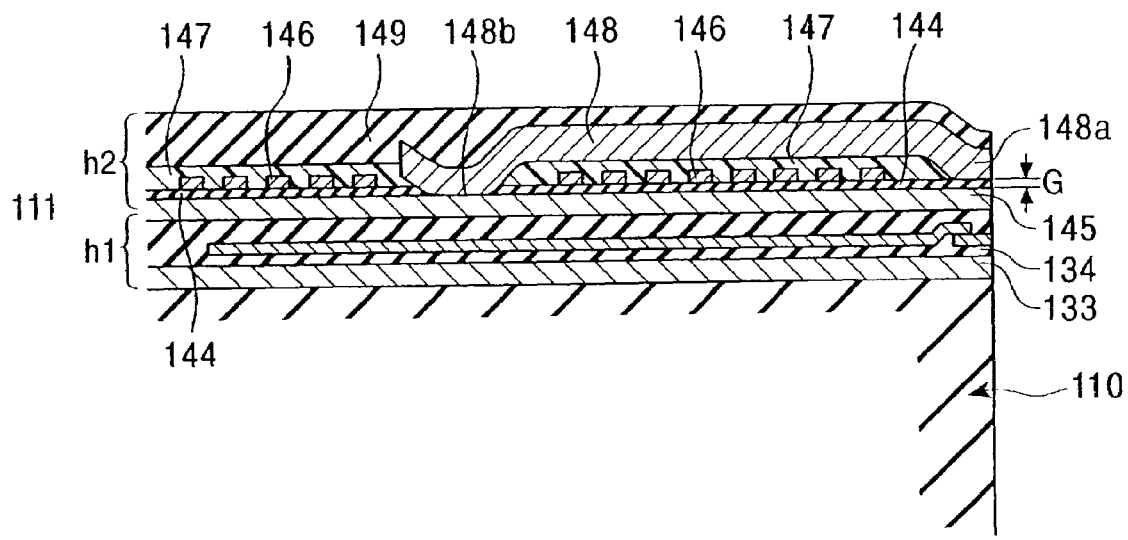
FIG. 9 is s sectional view showing an example of a magnetic head core provided on a magnetic head slider of the present invention.
Figure 10:
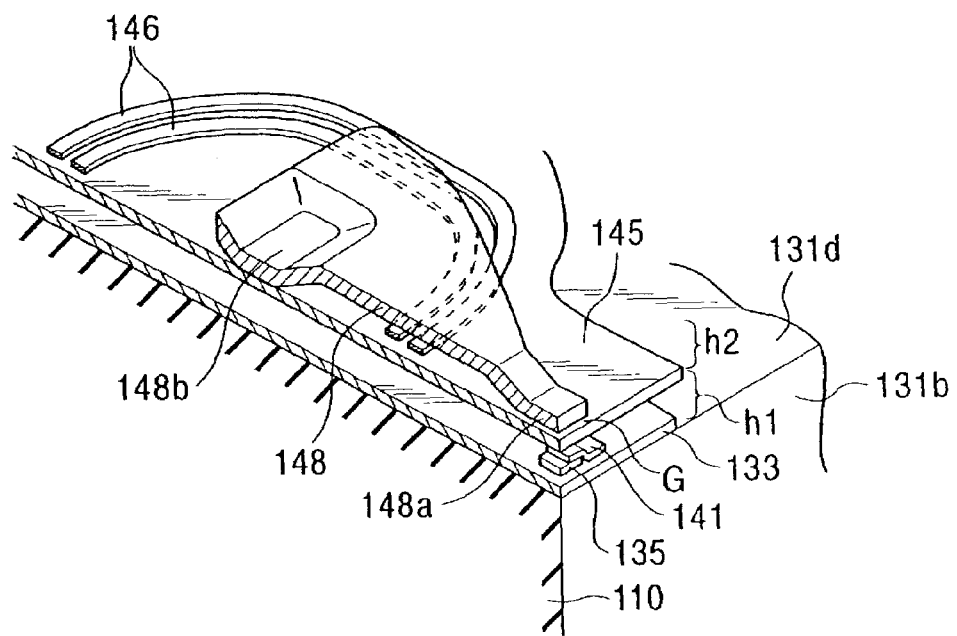
FIG. 10 is a partial sectional view showing an example of a magnetic head core provided on a magnetic head slider of the present invention.

The magnetic head core 111 of this embodiment is a combination type magnetic head core having the sectional structure shown in FIGS. 9 and 10, comprising a MR head (reading head) h1 and a inductive head (writing head) h2 which are laminated in turn on the rear end surface of the slider body 110.

The MR head h1 detects a leakage magnetic flux from the recording medium such as a disk or the like by using a magnetoresistive effect to read a magnetic signal.

As shown in FIGS. 9 and 10, the MR head h1 comprises a lower shield layer 133 made of a magnetic alloy such as sendust (Fe—Al—Si) and formed at the rear end of the slider body 110, a lower gap layer 134 formed on the lower shield layer 133 and made of a nonmagnetic material such as alumina ($Al_2O_3$) or the like, and a giant magnetoresistive material film (giant magnetoresistive element) 135 laminated on the lower gap layer 134.

In addition, hard bias layers for applying a bias magnetic field to the giant magnetoresistive material film 135, and electrode layers 141 for supplying a sensing current are formed on both sides of the giant magnetoresistive material film 135. Furthermore, an upper gap layer is formed on these layers, and an upper shield layer is formed on the upper gap layer. The upper shield layer is also used as a lower core layer 145 of the inductive head h2 provided thereon.

The inductive head h2 comprises a gap layer 144 formed on the lower core layer 145, a coil layer 146 formed on the gap layer 144 to have a spiral planar pattern, the coil layer 146 being surrounded by an insulating material layer 147. Furthermore, an upper core layer 148 is formed on the insulating material layer 147 so that the front end 148*a* thereof is opposed to the lower core layer 145 with a small gap therebetween in the ABS 131*b*, and the base end 148*b* is magnetically connected to the lower core layer 145. A protecting layer 149 made of alumina or the like is provided on the upper core layer 148.

In the inductive head h2, when a recording current is supplied to the coil layer 146, a recording magnetic field is applied to the core layer from the coil layer 146. Therefore, a magnetic signal can be recorded on the magnetic recording medium such as a magnetic disk or the like by means of a leakage magnetic field from the magnetic gap G between the lower core layer 145 and the front end of the upper core layer 148.

The giant magnetoresistive material film 135 comprises a laminate having a trapezoidal sectional shape and formed by laminating a free ferromagnetic layer, a nonmagnetic layer, a pinned magnetic layer and an antiferromagnetic layer.

Each of the free ferromagnetic layer and the pinned magnetic layer comprises a thin film of a ferromagnetic material. Examples of the ferromagnetic material include a Ni—Fe alloy, a Co—Fe alloy, a Ni—Co alloy, Co, a Ni—Fe—Co alloy, and the like. The free ferromagnetic layer may comprise a Co layer, a Ni—Fe alloy, a laminated structure of a Co layer and Ni—Fe alloy layer, or a laminated structure of a Co—Fe alloy layer and a Ni—Fe alloy layer. In a two-layer structure comprising a Co layer and a Ni—Fe alloy layer, a thin Co layer is preferably provided on the nonmagnetic layer side. In a two-layer structure comprising a Co—Fe alloy layer and a Ni—Fe alloy layer, the thin Co—Fe alloy layer is preferably arranged on the nonmagnetic layer side.

This is because in a giant magnetoresistive effect generating mechanism having a structure in which the nonmagnetic layer is held between the free ferromagnetic layer and the pinned ferromagnetic layer, the great effect of conduction electron spin-dependent scattering is produced in the Co—Cu interface, and the free ferromagnetic layer and the pinned ferromagnetic layer, which are made of the same material, have the lower possibility of producing a factor other than conduction electron spin-dependent scattering than the layers made of different materials, thereby obtaining the greater magnetoresistive effect. Therefore, with the pinned ferromagnetic layer made of Co, the free ferromagnetic layer preferably has a structure in which the nonmagnetic layer side is replaced by a Co layer having a predetermined thickness. Alternatively, the free ferromagnetic layer may comprise a concentration gradient layer in which the nonmagnetic layer side is put into an alloy state containing much Co so that the Co concentration gradually decreases to the nonmagnetic layer side, without the distinct Co layer provided.

Also, in a structure in which each of the free ferromagnetic layer and the pinned ferromagnetic layer comprises a Co—Fe alloy layer, and the nonmagnetic layer is held between the free ferromagnetic layer and the pinned ferromagnetic layer, the great effect of conduction electron spin-dependent scattering is exhibited in the interface between the Co—Fe alloy layer and a Cu layer, and the probability of producing a factor other than conduction electron spin-dependent scattering is low, thereby obtaining the higher magnetoresistive effect.

The nonmagnetic layer comprises a nonmagnetic material such as Cu, Cr, Au, Ag, or the like, and has a thickness of about 2 to 4 nm.

The antiferromagnetic layer is preferably made of, for example, a $X_1$—Mn alloy. In this composition formula, $X_1$ is preferably at least one of Ru, Rh, Ir, Pd, and Pt.

In a case in which $X_1$ of the $X_1$—Mn alloy is a single metal atom, the $X_1$ content is preferably in the range of 10 to 45 atomic % of Ru, 10 to 40 atomic % of Rh, 10 to 40 atomic % of Ir, 10 to 25 atomic % or Pd, or 10 to 25 atomic % of Pt. In the above description, "10 to 45 atomic %" means not less than 10 atomic %, and not more than 45 atomic %, and the upper and lower limits of the numerical range are defined as "not more than" and "not less than", respectively.

A Mn system alloy in the above composition range has a disordered crystal structure. The disordered crystal structure means a state different from an ordered crystal structure such as a face centered tetragonal crystal (fct ordered lattice; the CuAuI structure, or the like). Namely, the Mn alloy used is not heated at high temperature for a long time for forming the ordered crystal structure (CuAuI structure or the like) such as the face centered tetragonal crystal after being deposited by sputtering. The disordered crystal structure assumes the as-deposited state after sputtering or the like, or the annealed state after deposition.

In the $X_1$—Mn alloy (element $X_1$ is at least one of Ru, Rh, Ir, Pd, and Pt), the $X_1$ content is more preferably 37 to 63 atomic %. In the above description, "37 to 63 atomic %" means not less than 37 atomic %, and not more than 63 atomic %, and the upper and lower limits of the numerical range are defined as "not more than" and "not less than", respectively.

The layer of the $X_1$—Mn alloy in the above composition range formed by a deposition method such as sputtering or the like has a face centered tetragonal lattice with a disordered Mn atom sequence, and produces less exchange anisotropic magnetic field in the interface with the ferromagnetic layer. However, the disordered lattice structure is transformed to a face centered tetragonal lattice by annealing in a magnetic field so that a large exchange anisotropic magnetic field (Hex) having unidirectional anisotropy can be produced in the interface with the ferromagnetic layer.

The antiferromagnetic layer may comprise a $X_1$—Mn—$X_2$ alloy. In this composition formula, $X_1$ is preferably at least one of Ru, Rh, Ir, Pd, and Pt, as described above, and $X_2$ is preferably at least one of Ag, Mg, Al, Si, P, Be, B, C, Ti, V, Cr, Fe, Co, Ni, Cu, Zn, Ga, Ge, Y, Zn, Nb, Mo, Hf, Ta, W, Sn, and In. The composition ratio of $X_1$ to Mn is $X_1$:Mn=4:6 to 6:4 by atomic %. The $X_2$ content is 0.2 to 10 atomic %.

The antiferromagnetic layer comprising the $X_1$—Mn—$X_2$ alloy, which is annealed in a magnetic field after deposition, can also produce a large exchange anisotropic magnetic field (Hex) with unidirectional anisotropy in the interface with the ferromagnetic layer.

The antiferromagnetic layer comprising the $X_1$—Mn alloy or the $X_1$—Mn—$X_2$ alloy can apply the exchange anisotropic magnetic field having unidirectional anisotropy in the interface with the pinned ferromagnetic layer to pin the magnetization rotation of the pinned ferromagnetic layer with an external signal magnetic field.

The antiferromagnetic layer comprising the $X_1$—Mn alloy exhibits excellent corrosion resistance and less variation in the exchange anisotropic magnetic field (Hex) with a temperature change, as compared with Fe—Mn.

In the MR head h1 having the above construction, the electric resistance of the giant magnetoresistive material film 135 changes with a small leakage magnetic field from the magnetic disk 171 so that the recording contents of the magnetic disk 171 can be read by reading the change in resistance.

In manufacturing the magnetic head slider S having the above-described construction, a plurality of the magnetic head cores 111 are formed on a plate (wafer) made of, for example, $Al_2O_3TiC$, and then the plate is cut into a plurality of substrates. In forming a crown on each of the side rails 112 and the center rail 113, the surfaces of the substrates are lapped.

Figure 11A:
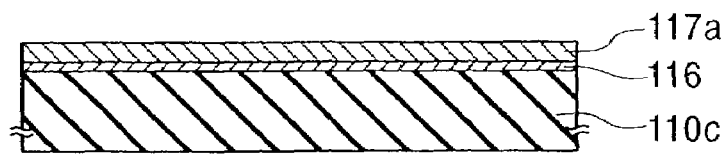
FIGS. 11A–11E are drawings showing the steps of the method of manufacturing the magnetic head slider shown in FIG. 7.

Then, as shown in FIG. 11A, an intermediate layer 116 of Si or SiC is formed on the surface (serving as the medium-facing surface on the magnetic disk side) of the substrate 110c by the sputtering or CVD method. Then, in forming a carbon film on the intermediate film 116 by the ECRCVD (Electron Cyclotron Resonance Chemical Vapor Deposition), the type of the reaction gas (gas containing carbon) supplied into the deposition apparatus is changed, and the substrate bias is controlled (decreased) to form a protrusion forming film 117a having a film hardness of 22 GPa or more.

Figure 11B:
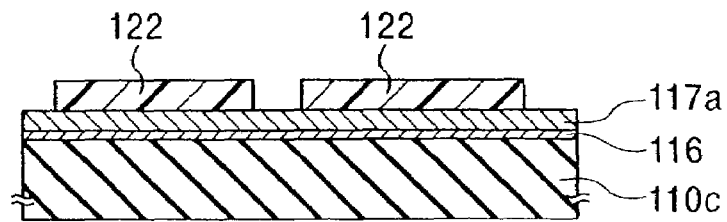

Then, a first resist is coated on the protrusion forming film 117a, and then exposed and developed to form the stripe resist patter 122 shown in FIG. 11B. The resist pattern 122 covers the region in which the side rails 112 and the center rail 113 are formed.

Figure 11C:
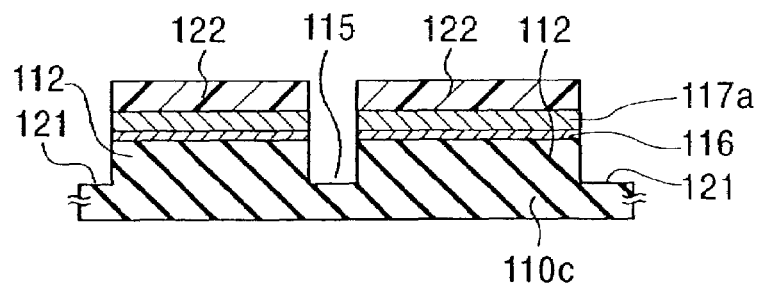

Then, the portions of the protrusion forming film 117a, the intermediate film 116, and the substrate 110c, which are not covered with the resist pattern 122, are successively etched out by ion milling, as shown in FIG. 11C. As a result, the negative pressure groove 115 is formed, and at the same time, grooves 121 for dividing into sliders are formed. Also, the side rails 112 on both sides of the negative pressure groove 115, and the center rail 113 are formed. Then, the resist pattern 122 is removed.

Figure 11D:
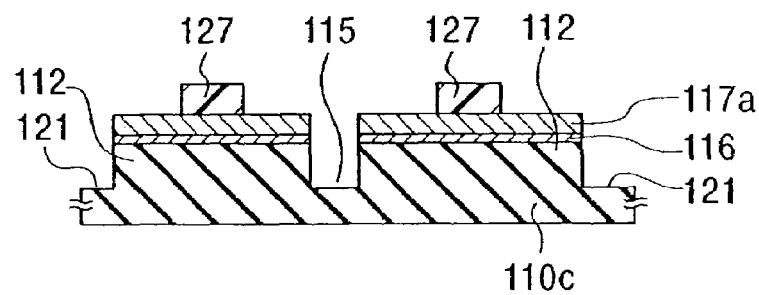

Next, a second resist is coated on the protrusion forming film 117a, and exposed and developed to form a resist pattern 127 having the same pattern as the first and second protrusions 117 and 118 at the predetermined positions of the side rails 112, as shown in FIG. 11D.

Figure 11E:
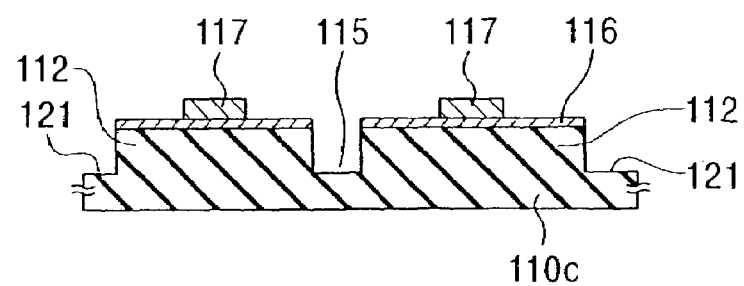

The portions of the protrusion forming film 117a, which are not covered with the resist pattern 127, are etched out by oxygen plasma etching. In this processing, the protrusion forming film 117a located below the resist pattern 127 is left to form the first and second protrusions 117 and 118, as shown in FIG. 11E. FIG. 11E is a sectional view taken along the direction coinciding with the width direction of the slider body 10, and thus the second protrusions 118 are hidden by the first protrusions 117 and not shown in FIG. 11E. In this step, the intermediate film 116 of Si or SiC is not etched with oxygen plasma.

Then, the resist pattern 127 is removed.

Then, the first and second protrusions 117 and 118 may be lapped to form the crowns.

Then, the substrate 110c is divided along the division grooves to obtain the magnetic head slider S shown in FIGS. 7 and 8.

The magnetic head slider S having the above construction flies and moves above the magnetic disk 171 by CSS to write and read magnetic information according to demand.

Therefore, with the magnetic disk 171 stopped, the magnetic head slider S is stopped in a state in which the surface of the second protrusion 118 provided on each of the side rails 112 is lightly pressed on the surface of the magnetic disk 171 by the urging force of a spring plate provided on the slider S, as shown in FIG. 8.

When rotation of the magnetic disk 171 is started in this state, an air flow is produced on the surface of the magnetic disk, and flows to the bottom side of the slider body 110. At the same time, lifting is produced at the air flow inlet side end of each of the side rails 112 due to the generation of the air flow, and the slider body 110 starts to float when the lifting becomes a magnitude sufficient to overcome the urging force of the spring plate. The air which passes through the air flow inlet side end of each side rail 112 and flows to the bottom side of the slider body 110, and the air which passes between the side rails 112 flow into the negative pressure groove 115 to produce large negative pressure. Therefore, the slider body 110 is inclined at the predetermined pitch angle with the air flow inlet side end inclined upward.

In the magnetic head slider S of this embodiment, the first and second protrusions 117 and 118 provided on the side rails 112 are made of a material having a film hardness of 22 GPa or more, and thus the abrasion resistance of the protrusions 117 and 118 can be significantly improved to prevent wear of the protrusions during sliding on the magnetic disk 171 when the magnetic disk 171 is started and stopped. Therefore, it is possible to prevent an increase in the area of contact between the slider S and the magnetic disk 171, and an increase in adhesion force between the slider S and the magnetic disk 171. Therefore, the magnetic head element provided on the magnetic head core 111 and the recording layer of the magnetic disk 171 can be prevented from being damaged due to an increase in adhesion force between the slider and the magnetic disk when rotation of the magnetic disk 171 is started.

In this embodiment, the first protrusion 117 is provided on the air flow inlet side of each of the side rails 112, and the second protrusion 118 is provided on the air flow outlet side. However, the present invention is not limited to this embodiment, and the protrusions are preferably provided on at least the air flow inlet side of the side rails 112. The protrusion having a film hardness of 22 GPa or more may be also provided on the center rail 113.

Figure 12:
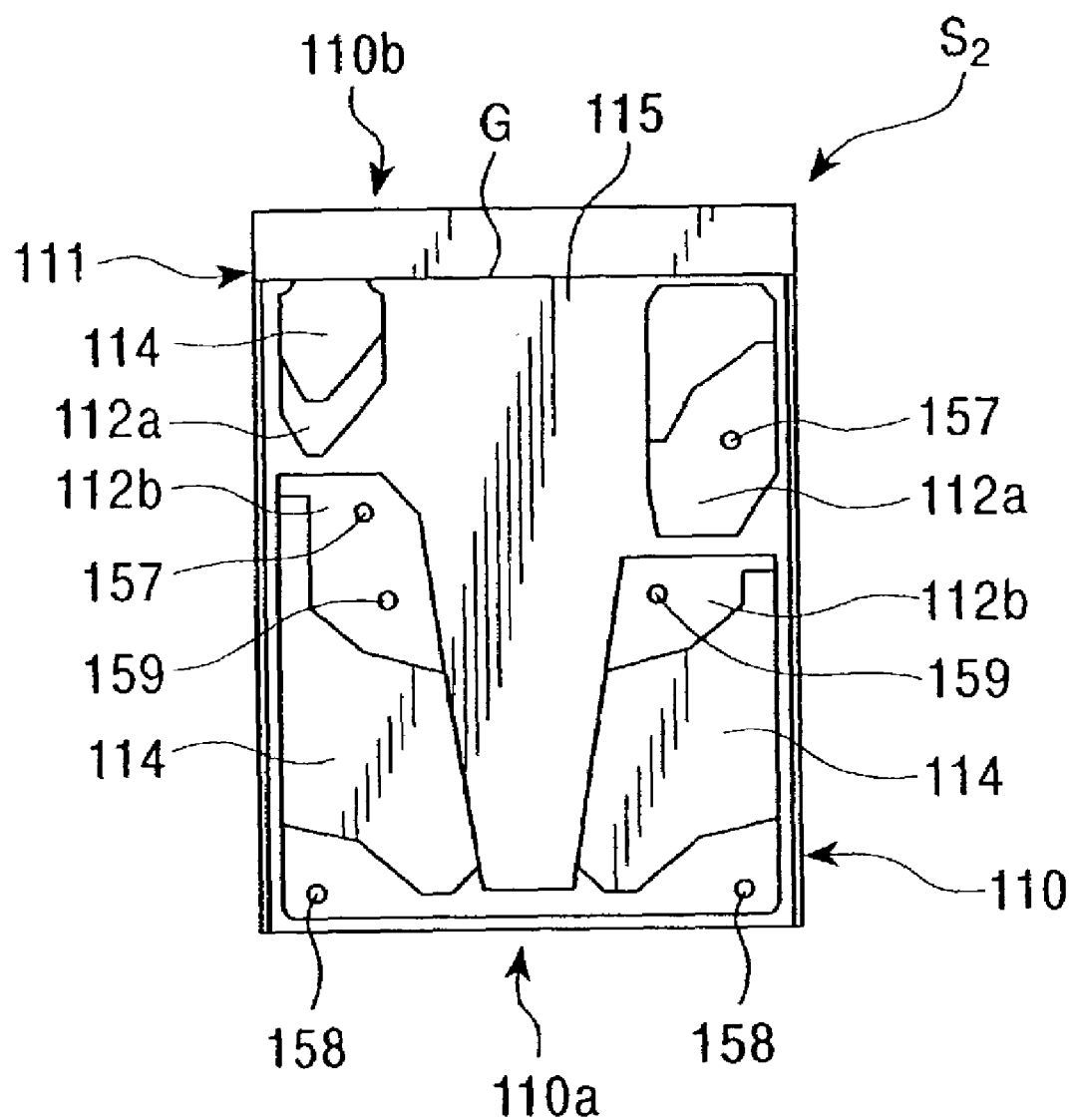
FIG. 12 is a bottom view of a magnetic head slider in accordance with a third embodiment of the present invention.

FIG. 12 is a bottom view illustrating a magnetic head slider according to a third embodiment of the present invention.

The magnetic head slider $S_2$ of the third embodiment is different from the second embodiment shown in FIGS. 7 and 8 in that a plurality of side rails 112a and 112b are provided on either edge portion of the medium-facing surface of the slider body 110 on the magnetic disk side so as to extend from the air flow inlet side 110a to the air flow outlet side 110b, and a pad 114 is provided on the surface of each of the plurality of the sliders 112a and 112b on the medium surface side. Each of the side rails 112a provided on the air flow outlet side 110b comprises a first protrusion 157, and each of the side rails 112b provided on the air flow inlet side 110a comprises second and third protrusions 158 and 159.

The pad 114 of each of the side rails 112a provided on the air flow outlet side 110b is provided on the surface thereof near the air flow outlet side 110b, and the first protrusions 157 are provided nearer to the air flow inlet side 110a than the pads 114.

The pad 114 of each of the side rails 112b provided on the air flow inlet side 110a is provided at substantially the center of the surface thereof, and the second protrusions 158 and the third protrusions 159 are provided nearer to the air flow inlet side 110a and the air flow outlet side 110b, respectively, than the pads 114.

Like in the first embodiment, the first, second and third protrusions 157, 158 and 159 are made of a material having a film hardness of 22 GPa or more.

The magnetic head slider $S_2$ of the third embodiment having the above construction has the same effect as the second embodiment, and the effect of decreasing spring pressure sensitivity when the magnetic head slider $S_2$ is mounted to a support arm through a spring plate because the plurality of the side rails 112a and 112b are provided to extend from the air flow inlet side 110a to the air flow outlet side 110b. Furthermore, it is possible to decrease a variation in the flying amount distribution of the magnetic head slider in the region from the center of the magnetic disk to the periphery thereof, thereby improving CFH (constant flying height).

A magnetic head slider according to a fourth embodiment of the present invention will be described below with reference to the drawings.

Figure 13:
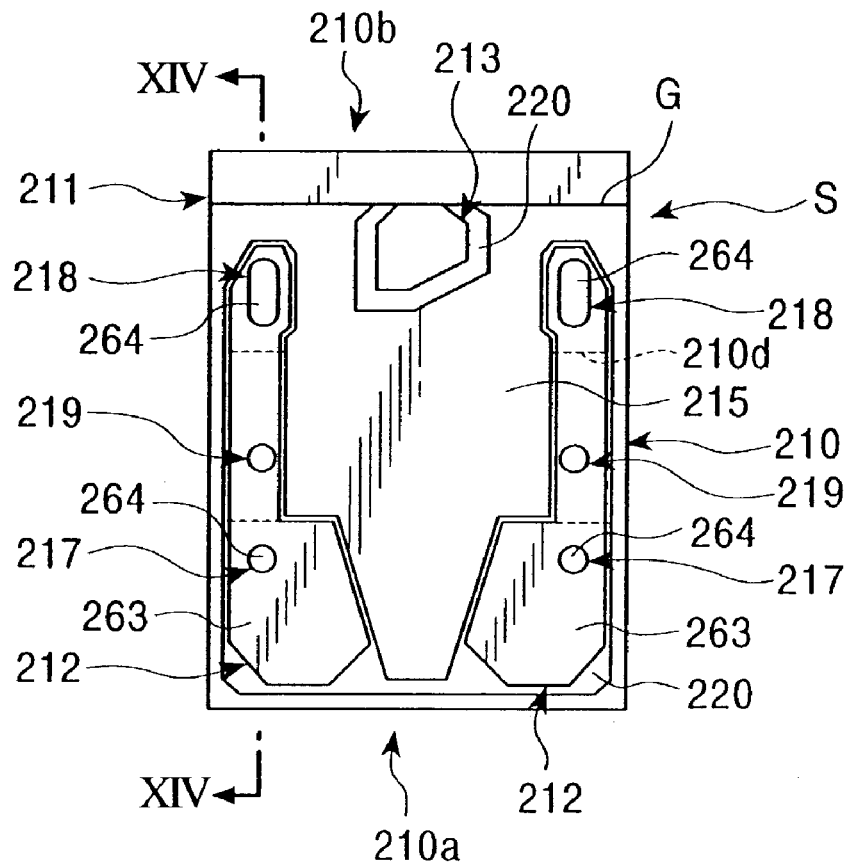
FIG. 13 is a bottom view of a magnetic head slider in accordance with a fourth embodiment of the present invention.
Figure 14:
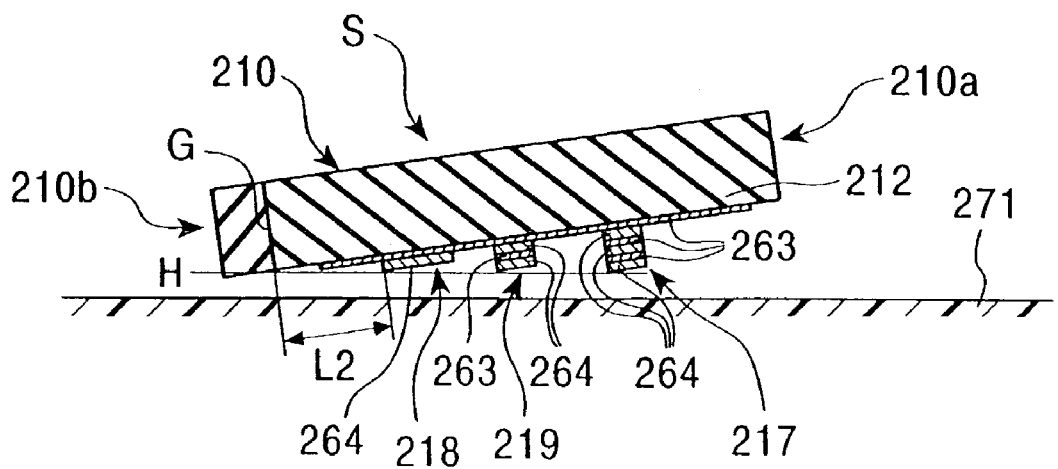
FIG. 14 is a sectional view taken along line XIV—XIV of FIG. 13 showing the flying state of the magnetic head slider.

FIG. 13 is a bottom view of the magnetic head slider of this embodiment of the present invention, and FIG. 14 is a sectional view of the magnetic head slider in a flying state taken along line XIV—XIV in FIG. 13.

The magnetic head slider S of this embodiment comprises a plate-shaped slider body 210 composed of $Al_2O_3TiC$ or the like, and a magnetic head core 211 having the construction which will be described below. The whole portion except the magnetic core comprises a ceramic substrate.

In the slider body 210, two side rails 212 are formed at both side edges of the bottom thereof (the surface shown in FIG. 13, which is the medium-facing surface facing a magnetic disk 271) so as to extend from the front side to the rear side of the slider body 210.

The lower side of the slider body 210 shown in FIG. 13 is referred to as "the front side" of the slider body 210, which is generally referred to as "the leading side" 210a of the slider in which an air flow flows from the magnetic disk 271. In contrast, the upper side of the slider body 210 shown in FIG. 13 is referred to as "the rear side" of the slider body 10, which is generally referred to as "the trailing side" 210b of the slider from which an air flow from the magnetic disk 271 flows out.

Each of the side rails 212 is provided for generating positive pressure, and comprises the air flow inlet side end having a larger width than the air flow outlet side end, and a narrow central portion formed between the inlet side end and the outlet side end. Each of the side rails 212 has a notched portion 210d formed in the central portion thereof, as shown by a chain line inn FIG. 13.

Also, an island-like center rail 213 is formed between the rear ends of both side rails 212. Each of the side rails 212 and the center rail 213 preferably comprises a crown formed on the surface thereof, and a step 220 formed in the periphery thereof. The slider body 210 further comprises a negative pressure groove 215 formed at the bottom thereof so as to be held between both side rails 212. The negative pressure groove 215 comprises the front end portion gradually widening from the front side to the central portion, and the rear end portion divided into two parts narrower than the central portion by the center rail 213.

As shown in FIG. 14, an intermediate film 263 made of Si, SiC, or the like is provided on the surface of each of the side rails 212 and the center rail 213.

The thickness of the intermediate layer 263 is about 0.5 nm.

Each of the side rails 212 has first, second and third protrusions 217, 218 and 219 formed thereon through the intermediate film 263.

The first protrusion 217 is provided on the air flow inlet side, the second protrusion 218 is provided on the air flow outlet side, and the third protrusion 219 is provided between the first and second protrusions 217 and 218. Therefore, the second protrusions 218 are provided at the positions nearest to the magnetic head core 211.

The first and third protrusions 217 and 219 have a circular cross-sectional shape, and the second protrusions 218 have an elliptic cross-sectional shape, and are formed so that the long axis is arranged in the length direction of the side rails 212.

The heights of the plurality of the protrusions gradually decrease in the direction from the air flow inlet side 210a to the air flow outlet side 210b of the slider body 210, i.e., the protrusions becomes lower as they come nearer to the magnetic gap G. Namely, the protrusions are arranged in the order of the second protrusions 218, third protrusions 219 and the first protrusions 217 from the lowest.

Each of the second protrusions 218 comprises a carbon film 264, as shown in FIG. 14.

Where the flying amount of the magnetic head slider S is 25 nm, and the distance between the second protrusions 218 and the magnetic gap G is 300 µm, the height of each of the second protrusions 218 is 40 nm or less, preferably 30 nm to 35 nm. However, when the height of the protrusions 218 exceeds 40 nm, the second protrusions 218 come nearer to the magnetic disk 271 than the magnetic gap G in flying because the slider body 210 is inclined at about 100 µRad in flying. Namely, the distance between the magnetic gap G and the magnetic disk 271 unfavorably becomes larger than the distance between the protrusions 218 and the magnetic disk 271.

Each of the third protrusions 219 comprises a carbon film 264 and an intermediate film 263 of Si, SiC, or the like, which are alternately formed thereon. In FIG. 14, the carbon film 264, the intermediate film 263, and the carbon film 264 are laminated in this order from the slider body side.

The third protrusions 219 are higher than the second protrusions 218, and where the flying amount of the magnetic head slider S is 25 nm, and the distance between the third protrusions 219 and the magnetic gap G is 600 µm, the height of each of the third protrusions 219 is 35 nm or more, preferably about 40 nm to 45 nm.

Each of the first protrusions 217 also comprises the carbon film 264 and the intermediate film 263 of Si, SiC, or the like, which are alternately formed thereon. In FIG. 14, the carbon film 264, the intermediate film 263, the carbon film 264, the intermediate film 263, and the carbon film 264 are laminated in this order from the slider body side.

The first protrusions 217 are higher than the third protrusions 219, and where the flying amount of the magnetic head slider S is 25 nm, and the distance between the first protrusions 217 and the magnetic gap G is 800 µm, the height of each of the first protrusions 217 is 35 nm or more, preferably about 40 nm to 45 nm.

Each of the intermediate films 263 which constitute the first and third protrusions 217 and 219 has a thickness of about 4 nm, and each of the carbon films 264 has a thickness of about 20 nm.

Each of the intermediate films 263 functions as an etching stopper in formation of each protrusion. Particularly, each of the intermediate films 263 (the first intermediate layers 263) formed on the surfaces of the side rails 212 functions as an adhesive layer.

The carbon film 64 which constitutes each of the first, second and third protrusions 217, 218 and 219 preferably comprises a carbon film having a film hardness of 22 GPa or more because the abrasion resistance of the protrusions 217, 218 and 219 can be improved.

The film hardness is determined by measuring a penetration depth with a load using a penetration hardness testing machine, and determining according to the following equation (1). As a measurement indenter provided on the penetration hardness testing machine, a diamond triangular pyramid indenter having an open angle (α) of 65° was used, as shown in FIG. 5. In FIG. 5, Ap denotes a projected area.

$$\text{Film hardness} = P/As = 37.962 \times 10^{-3} \times P/h^2 \qquad (1)$$

(wherein P represents the load, h represents the penetration depth, and As represents the surface area of the triangular pyramid indenter with displacement h).

As the carbon film having a film hardness 22 GPa or more, a carbon film having a hydrogen content of less than 40 atomic % is used, a carbon film having a hydrogen content of 35 atomic % is preferably used, and a cathodic arc carbon (CAC) film having a hydrogen content of 0 atomic % is more preferably used.

The height of the second protrusions 218 is preferably set so that in a flying state of the magnetic head slider S, the second protrusions 218 do not project to the magnetic disk side from a line H connecting the third protrusions 219 or the first protrusions 217 and the magnetic gap G. This is because the magnetic gap G can be advantageously brought nearer to the magnetic disk than the first, second and third protrusions 217, 218 and 219 during flying of the magnetic head slider S.

The second protrusions 218 are preferably provided at positions at a distance $L_2$ from the magnetic gap G which is 25% or less of the length of the slider body 210. For example, when the length of the slider body 210 is 1.2 mm, $L_2$ is 300 µm or less. This causes the second protrusions 218 to be interposed between the medium-facing surface of the slider body 210 and the magnetic disk near the magnetic gap G during stopping of the magnetic disk. In addition, since the distance between the second protrusions 218 and the magnetic gap G is small, the effect of preventing adhesion of the medium-facing surface of the slider body 210 to the magnetic disk 271 due to the liquid film of a lubricant can be further improved to obtain the excellent effect of preventing adhesion between the slider body 210 and the magnetic disk 271.

Each of the first, second and third protrusions 217, 218 and 219 preferably has a crown formed on the surface thereof.

Next, the structure of the magnetic head core 211 formed at the center of the rear end of the slider body 210 will be described.

Figure 15:
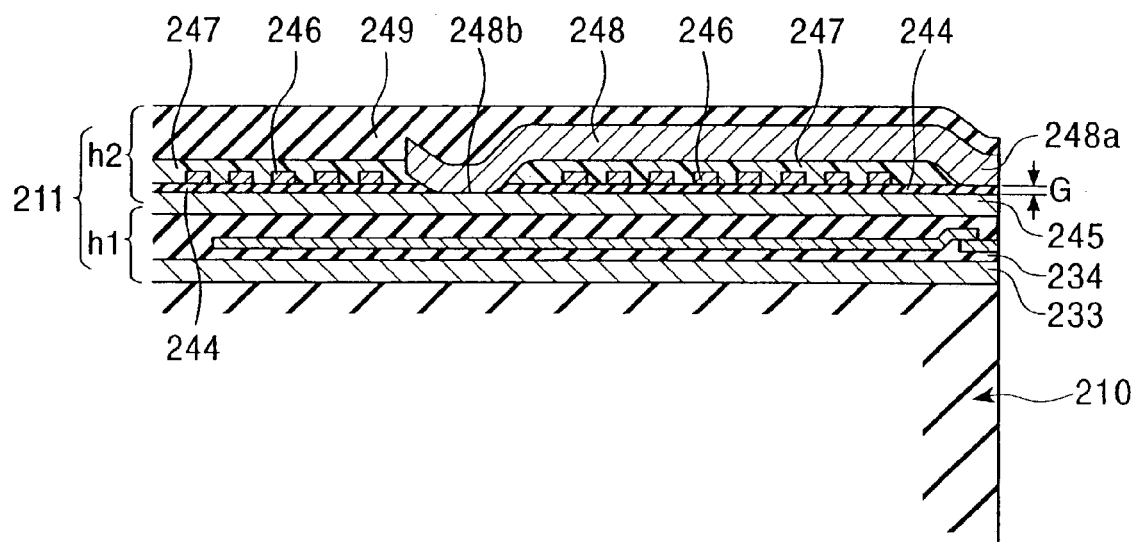
FIG. 15 is s sectional view showing an example of a magnetic head core provided on a magnetic head slider of the present invention.
Figure 16:
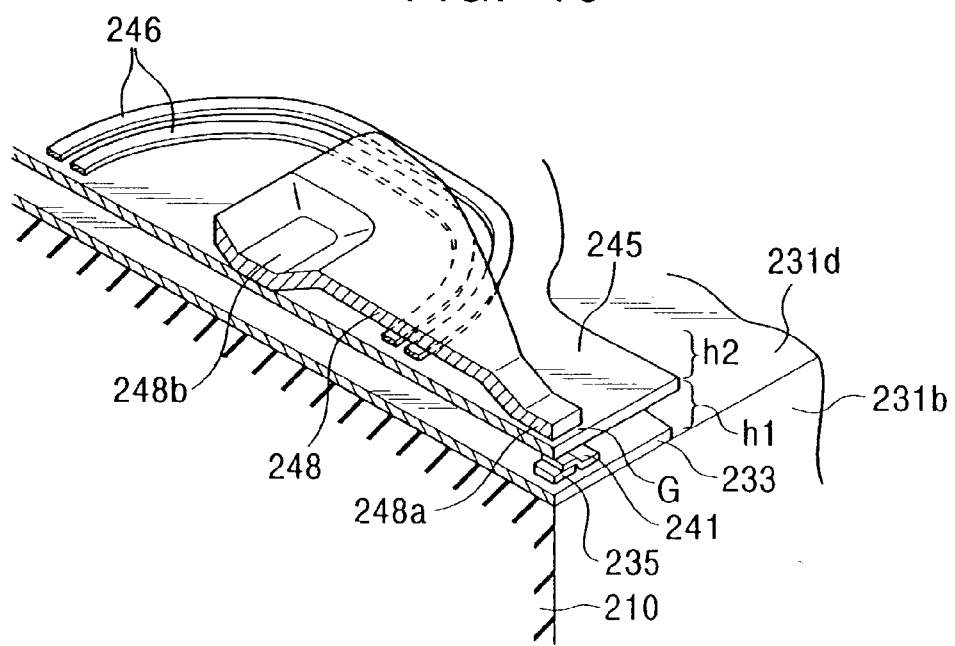
FIG. 16 is a partial sectional view showing an example of a magnetic head core provided on a magnetic head slider of the present invention.

The magnetic head core 211 of this embodiment is a combination type magnetic head core having the sectional structure shown in FIGS. 15 and 16, comprising a MR head (reading head) h1 and a inductive head (writing head) h2 which are laminated in turn on the rear end surface of the slider body 210.

The MR head h1 detects a leakage magnetic flux from the recording medium such as a disk or the like by using a magnetoresistive effect to read a magnetic signal.

As shown in FIGS. 15 and 16, the MR head h1 comprises a lower shield layer 233 made of a magnetic alloy such as sendust (Fe—Al—Si) and formed at the rear end of the slider body 210, a lower gap layer 234 formed on the lower shield layer 233 and made of a nonmagnetic material such as alumina ($Al_2O_3$) or the like, and a giant magnetoresistive material film (giant magnetoresistive element) 235 laminated on the lower gap layer 234.

In addition, hard bias layers for applying a bias magnetic field to the giant magnetoresistive material film 235, and electrode layers 241 for supplying a sensing current are formed on both sides of the giant magnetoresistive material film 235. Furthermore, an upper gap layer is formed on these layers, and an upper shield layer is formed on the upper gap layer. The upper shield layer is also used as a lower core layer 245 of the inductive head h2 provided thereon.

The inductive head h2 comprises a gap layer 244 formed on the lower core layer 245, a coil layer 246 formed on the gap layer 244 to have a spiral planar pattern, the coil layer 246 being surrounded by an insulating material layer 247. Furthermore, an upper core layer 248 is formed on the insulating material layer 247 so that the front end 248*a* thereof is opposed to the lower core layer 245 with a small gap therebetween in the ABS 231*b*, and the base end 248*b* is magnetically connected to the lower core layer 245. A protecting layer 249 made of alumina or the like is provided on the upper core layer 248.

In the inductive head h2, when a recording current is supplied to the coil layer 246, a recording magnetic field is applied to the core layer from the coil layer 246. Therefore, a magnetic signal can be recorded on the magnetic recording medium such as a magnetic disk or the like by means of a leakage magnetic field from the magnetic gap G between the lower core layer 245 and the front end of the upper core layer 248.

The giant magnetoresistive material film 235 comprises a laminate having a trapezoidal sectional shape and formed by laminating a free ferromagnetic layer, a nonmagnetic layer, a pinned magnetic layer and an antiferromagnetic layer.

Each of the free ferromagnetic layer and the pinned magnetic layer comprises a thin film of a ferromagnetic material. Examples of the ferromagnetic material include a Ni—Fe alloy, a Co—Fe alloy, a Ni—Co alloy, Co, a Ni—Fe—Co alloy, and the like. The free ferromagnetic layer may comprise a Co layer, a Ni—Fe alloy, a laminated structure of a Co layer and Ni—Fe alloy layer, or a laminated structure of a Co—Fe alloy layer and a Ni—Fe alloy layer. In a two-layer structure comprising a Co layer and a Ni—Fe alloy layer, a thin Co layer is preferably provided on the nonmagnetic layer side. In a two-layer structure comprising a Co—Fe alloy layer and a Ni—Fe alloy layer, the thin Co—Fe alloy layer is preferably arranged on the nonmagnetic layer side.

This is because in a giant magnetoresistive effect generating mechanism having a structure in which the nonmagnetic layer is held between the free ferromagnetic layer and the pinned ferromagnetic layer, the great effect of conduction electron spin-dependent scattering is produced in the Co—Cu interface. Also, the free ferromagnetic layer and the pinned ferromagnetic layer, which are made of the same material, have the lower possibility of producing a factor other than conduction electron spin-dependent scattering than the layers, which are made of different materials, thereby obtaining the greater magnetoresistive effect. Therefore, with the pinned ferromagnetic layer made of Co, the free ferromagnetic layer preferably has a structure in which the nonmagnetic layer side is replaced by a Co layer having a predetermined thickness. Alternatively, the free ferromagnetic layer may comprise a concentration gradient layer in which the nonmagnetic layer side is put into an alloy state containing much Co so that the Co concentration gradually decreases to the nonmagnetic layer side, without the distinct Co layer provided.

Also, in a structure in which each of the free ferromagnetic layer and the pinned ferromagnetic layer comprises a Co—Fe alloy layer, and the nonmagnetic layer is held between the free ferromagnetic layer and the pinned ferromagnetic layer, the great effect of conduction electron spin-dependent scattering is exhibited in the interface between the Co—Fe alloy layer and a Cu layer, and the probability of producing a factor other than conduction electron spin-dependent scattering is low, thereby obtaining the higher magnetoresistive effect.

The nonmagnetic layer comprises a nonmagnetic material such as Cu, Cr, Au, Ag, or the like, and has a thickness of about 2 to 4 nm.

The antiferromagnetic layer is preferably made of, for example, a $X_1$—Mn alloy. In this composition formula, $X_1$ is preferably at least one of Ru, Rh, Ir, Pd, and Pt.

In a case in which $X_1$ of the $X_1$—Mn alloy is a single metal atom, the $X_1$ content is preferably in the range of 10 to 45 atomic % of Ru, 10 to 40 atomic % of Rh, 10 to 40 atomic % of Ir, 10 to 25 atomic % or Pd, or 10 to 25 atomic % of Pt. In the above description, "10 to 45 atomic %" means not less than 10 atomic %, and not more than 45 atomic %, and the upper and lower limits of the numerical range are defined as "not more than" and "not less than", respectively.

A Mn system alloy in the above composition range has a disordered crystal structure. The disordered crystal structure means a state different from an ordered crystal structure such as a face centered tetragonal crystal (fct ordered lattice; the CuAuI structure, or the like). Namely, the Mn alloy used is not heated at high temperature for a long time for forming the ordered crystal structure (CuAuI structure or the like) such as the face centered tetragonal crystal after being deposited by sputtering. The disordered crystal structure assumes the as-deposited state after sputtering or the like, or the annealed state after deposition.

In the $X_1$—Mn alloy (element $X_1$ is at least one of Ru, Rh, Ir, Pd, and Pt), the $X_1$ content is more preferably 37 to 63 atomic %. In the above description, "37 to 63 atomic %" means not less than 37 atomic %, and not more than 63 atomic %, and the upper and lower limits of the numerical range are defined as "not more than" and "not less than", respectively.

The layer of the $X_1$—Mn alloy in the above composition range formed by a deposition method such as sputtering or the like has a face centered tetragonal lattice with a disordered Mn atom sequence, and produces less exchange anisotropic magnetic field in the interface with the ferromagnetic layer. However, the disordered lattice structure is transformed to a face centered tetragonal lattice by annealing in a magnetic field so that a large exchange anisotropic magnetic field (Hex) having unidirectional anisotropy can be produced in the interface with the ferromagnetic layer.

The antiferromagnetic layer may comprise a $X_1$—Mn—$X_2$ alloy. In this composition formula, $X_1$ is preferably at least one of Ru, Rh, Ir, Pd, and Pt, as described above, and $X_2$ is preferably at least one of Ag, Mg, Al, Si, P, Be, B, C, Ti, V, Cr, Fe, Co, Ni, Cu, Zn, Ga, Ge, Y, Zn, Nb, Mo, Hf, Ta, W, Sn, and In. The composition ratio of $X_1$ to Mn is $X_1$:Mn=4:6 to 6:4 by atomic %. The $X_2$ content is 0.2 to 10 atomic %.

The antiferromagnetic layer comprising the $X_1$—Mn—$X_2$ alloy, which is annealed in a magnetic field after deposition, can also produce a large exchange anisotrpic magnetic field (Hex) with unidirectional anisotropy in the interface with the ferromagnetic layer.

The antiferromagnetic layer comprising the $X_1$—Mn alloy or the $X_1$—Mn—$X_2$ alloy can apply the exchange anisotropic magnetic field having unidirectional anisotropy in the interface with the pinned ferromagnetic layer to pin the magnetization rotation of the pinned ferromagnetic layer with an external signal magnetic field.

The antiferromagnetic layer comprising the $X_1$—Mn alloy exhibits excellent corrosion resistance and less variation in the exchange anisotropic magnetic field (Hex) with a temperature change, as compared with Fe—Mn.

In the MR head h1 having the above construction, the electric resistance of the giant magnetoresistive material film 235 changes with a small leakage magnetic field from the magnetic disk so that the recording contents of the magnetic disk can be read by reading the change in resistance.

In manufacturing the magnetic head slider S having the above-described construction, a plurality of the magnetic head cores 211 are formed on a plate (wafer) made of, for example, $Al_2O_3TiC$, and then the plate is cut into a plurality of substrates. In forming a crown on each of the side rails 212 and the center rail 213, the surfaces of the substrates are lapped.

Figure 17A:
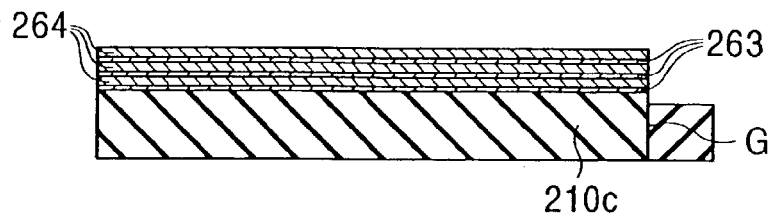
FIGS. 17A–17F are drawings showing the steps of the method of manufacturing the magnetic head slider shown in FIGS. 13 and 14.

Then, as shown in FIG. 17A, the intermediate film 263 of Si or SiC is formed on the surface (serving as the medium-facing surface on the magnetic disk side) of the substrate 210c by the sputtering or CVD method. Then, the carbon film 264 is formed by the ECRCVD (Electron Cyclotron Resonance Chemical Vapor Deposition) method. The intermediate film 263 and the carbon film 264 are alternately deposited to form a multilayer film comprising six layers. In forming the carbon film 264, preferably, the type of the reaction gas (gas containing carbon) supplied into the deposition apparatus is changed, and the substrate bias is controlled (increased) to form the carbon film 264 having a low hydrogen content of less than 30 atomic % and a film hardness of 22 GPa or more. In this way, the hydrogen content of the carbon film 264 is preferably decreased to strengthen carbon atom bonding, thereby increasing hardness and forming the protrusions having excellent abrasion resistance.

When the carbon film 264 comprises cathodic arc carbon, the carbon film is deposited by arc discharge of a graphite block in a vacuum atmosphere in the deposition apparatus in which the substrate 210c having the intermediate layer 263 formed thereon is arranged.

Figure 17B:
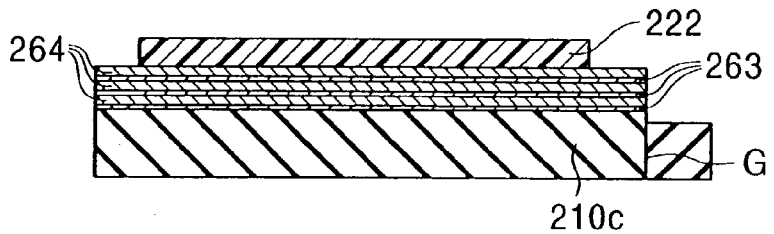

Then, a first resist is coated on the carbon film 264, and then exposed and developed to form the stripe resist patter 222 shown in FIG. 17B. The resist pattern 222 covers the region in which the side rails 212 and the center rail 213 are formed.

Figure 17C:
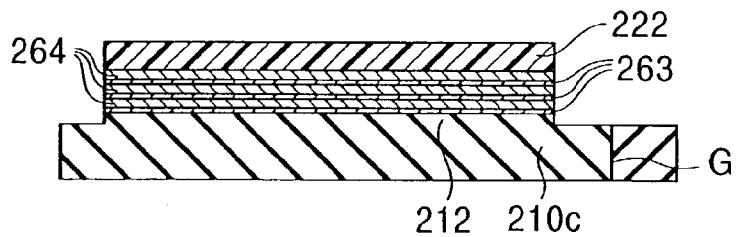

Then, the portions of the carbon films 264, the intermediate films 263, and the substrate 210c, which are not covered with the resist pattern 222, are successively etched out by ion milling, as shown in FIG. 17C. As a result, the side rails 212 and the center rail 213 are formed. At the same time, the negative pressure groove 215 is formed between the side rails 212, and division grooves (not shown) for dividing into sliders are formed. Then, the resist pattern 222 is removed.

Figure 17D:
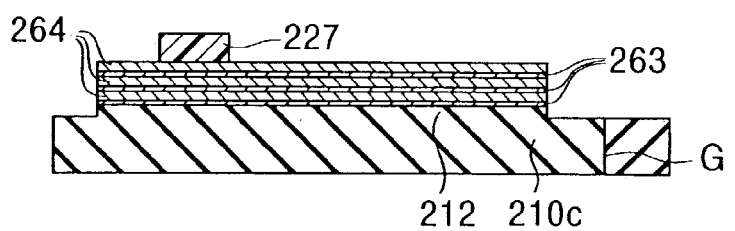

Next, a second resist is coated on the outermost carbon film (the third carbon film) 264, and then exposed and developed to form a resist pattern 227 having the same pattern as the first protrusions 217 at the predetermined positions of the side rails 212, as shown in FIG. 17D.

Figure 17E:
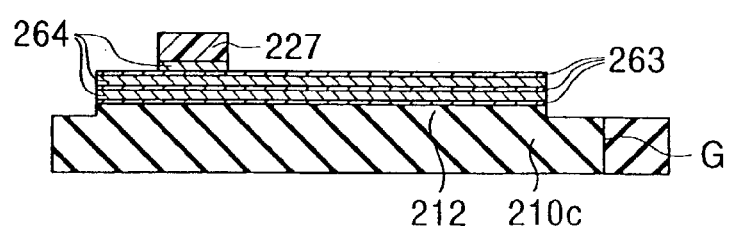

The portions of the outermost carbon film (the sixth layer from the slider body side) 264, which are not covered with the resist pattern 227, are etched out by oxygen plasma etching. In this processing, the intermediate film 263 (the third intermediate film) located below the outermost carbon film 264 functions as an etching stopper so that the only the outermost carbon film 264 is etched, while the intermediate film 263 is not etched, as shown in FIG. 17E.

Figure 17F:
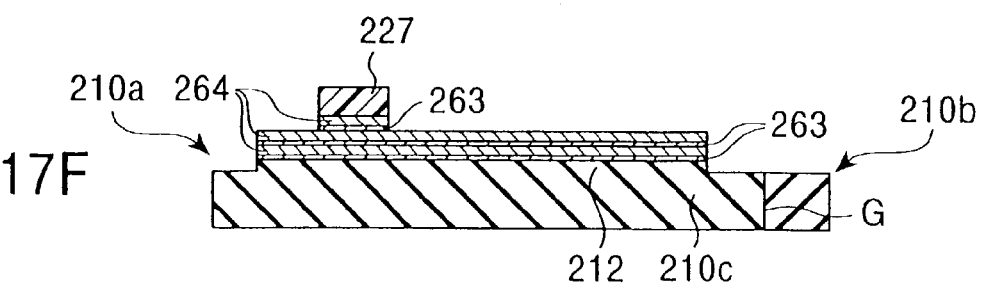

Then, the portions of the third intermediate film 263, which are not covered with the resist pattern 227, are etched out by $CF_4$ plasma etching, as shown in FIG. 17F. In this processing, only the intermediate film 263 is etched, while the carbon film 164 (the second carbon film) located below the third intermediate film 263 is not etched.

Figure 18A:
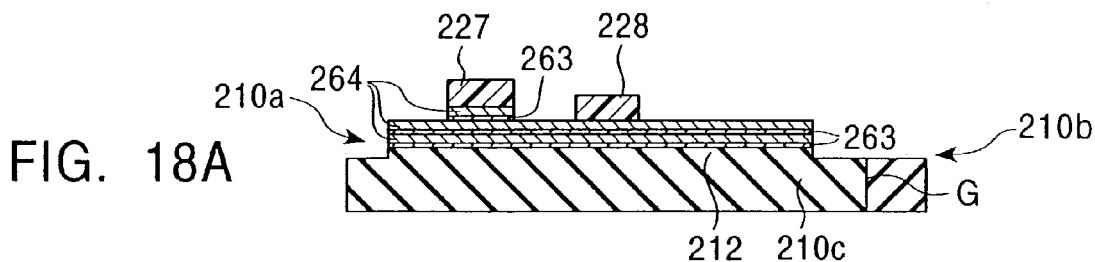
FIGS. 18A–18E are drawings showing the steps of the method of manufacturing the magnetic head slider shown in FIGS. 13 and 14.

Then, a third resist is coated on the carbon film (the second carbon film) 264 in the fourth layer from the slider body side, and then exposed and developed to form a resist pattern 228 having the same pattern as the third protrusions 219 at the predetermined positions of the side rails 212, as shown in FIG. 18A.

Figure 18B:
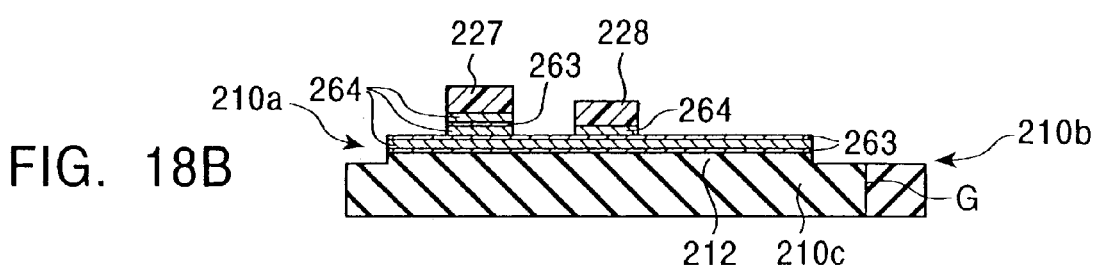

The portions of the second carbon film 264, which are not covered with the resist patterns 227 and 228, are etched out by oxygen plasma etching. In this processing, the intermediate film 263 (the second intermediate film) located below the second carbon film 264 functions as an etching stopper so that only the second carbon film 264 is etched, while the second intermediate film 263 is not etched, as shown in FIG. 18B.

Figure 18C:
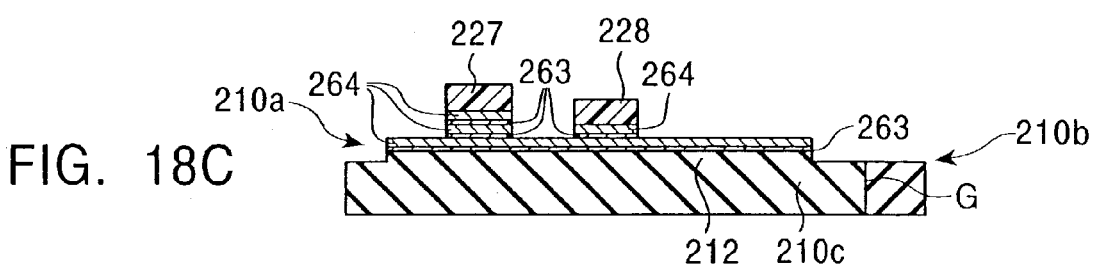

Then, the portions of the second intermediate film 263, which are not covered with the resist patterns 227 and 228, are etched out by $CF_4$ plasma etching, as shown in FIG. 18C. In this processing, only the second intermediate film 263 is etched, while the carbon film 164 (the first carbon film) located below the second intermediate film 263 is not etched.

Figure 18D:
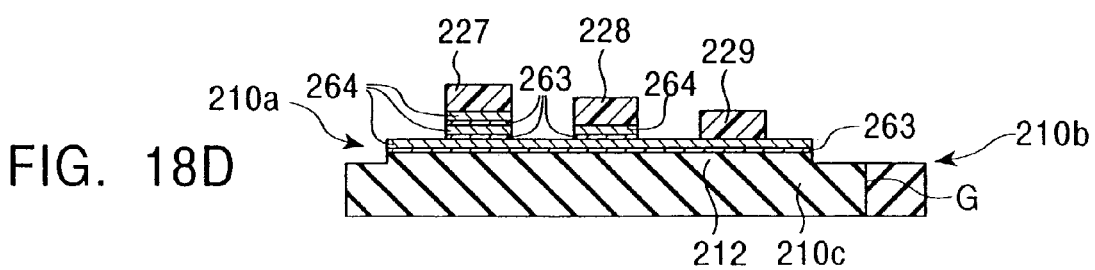

Then, a fourth resist is coated on the carbon film (the first carbon film) 264 in the second layer from the slider body side, and then exposed and developed to form a resist pattern 229 having the same pattern as the second protrusions 218 at the predetermined positions of the side rails 212, as shown in FIG. 18D.

Figure 18E:
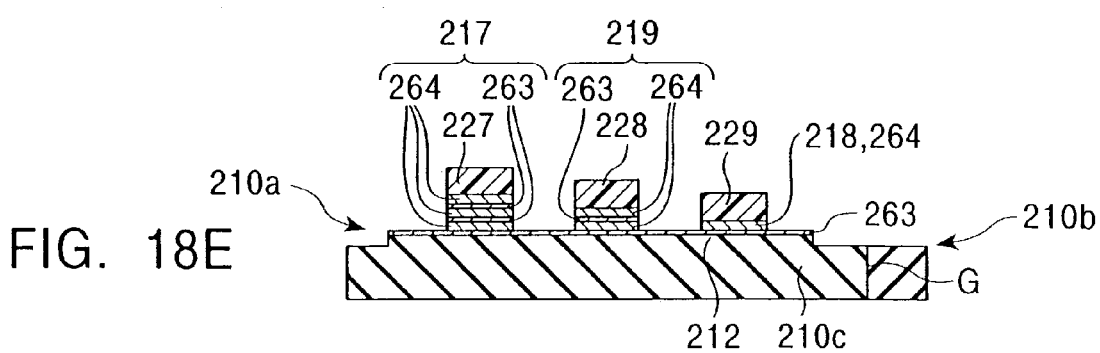

The portions of the first carbon film 264, which are not covered with the resist patterns 227, 228 and 229, are etched out by oxygen plasma etching. In this processing, the intermediate film 263 (the first intermediate film) located below the first carbon film 264 functions as an etching stopper so that only the first carbon film 264 is etched, while the first intermediate film 263 is not etched, as shown in FIG. 18E.

Then, the resist patterns 227, 228 and 229 are removed to form the first, second and third protrusions 217, 218 and 219.

Then, the first, second and third protrusions 217, 218 and 219 may be lapped to form the crowns on the surfaces thereof.

Then, the substrate 210c is divided along the division grooves to obtain the magnetic head slider S shown in FIGS. 13 and 14.

In the method of manufacturing the magnetic head slider S, the multilayer film comprising six layers is formed by alternately laminating the intermediate film 263 and the carbon film 264 on the medium-facing surface of the slider body 210, and only the necessary portions of the multilayer film are etched to form the first, second and third protrusions 217, 218 and 219. However, the manufacturing method is not limited to this. For example, a plurality of masks each having holes in the same pattern as the protrusions are prepared, and placed on the medium-facing surface of the slider body so that the intermediate film and the carbon film are alternately deposited in the holes to form the protrusions.

The magnetic head slider S having the above construction flies and moves above the magnetic disk 71 by CSS operation to write and read magnetic information according to demand.

Therefore, with the magnetic disk stopped, the magnetic head slider S is stopped in a state in which the surface of the second protrusion 218 provided on each of the side rails 212 is lightly pressed on the surface of the magnetic disk by the urging force of a spring plate provided on the slider S.

When rotation of the magnetic disk is started in this state, an air flow is produced on the surface of the magnetic disk, and flows to the bottom side of the slider body 210. At the same time, lifting is produced at the air flow inlet side end of each of the side rails 212 due to the generation of the air flow, and the slider body 210 starts to float when the lifting becomes a magnitude sufficient to overcome the urging force of the spring plate. The air which passes through the air flow inlet side end of each side rail 212 and flows to the bottom side of the slider body 210, and the air which passes between the side rails 212 flow into the negative pressure groove 215 to produce large negative pressure. Therefore, the slider body 210 is inclined at the predetermined pitch angle with the air flow inlet side end inclined upward.

In the magnetic head slider S of this embodiment, the second protrusions 218 lower than the first and third protrusions 217 and 219 are interposed between the medium-facing surface of the slider body 210 and the magnetic disk near the magnetic head core 211 (on the air flow outlet side 210a) during stopping of the magnetic disk. Therefore, the meniscus of the lubricant coated on the surface of the magnetic disk has a large radius in the peripheries of the second protrusions 218 to improve adhesion of the medium-facing surface of the slider body 210 to the magnetic disk due to the liquid film of the lubricant, thereby improving the effect of decreasing adhesion between the slider body 210 and the magnetic disk. In addition, since the second protrusions 218 provided at the positions nearest to the magnetic head core 211 are lower than the other first and third protrusions 217 and 219, the second protrusions 218 nearest to the magnetic head core 211 can be avoided from projecting from the magnetic gap G provided on the magnetic head core 211 toward the magnetic disk side during flowing of the magnetic head slider with a pitch angle of about 100 μRad. Namely, the magnetic gap G can be advantageously brought nearer to the magnetic disk than the first, second and third protrusions 217, 218 and 219.

In this embodiment, each of the second protrusions 218 comprises the carbon film 264, each of the third protrusions 219 comprises a three-layer multilayer film formed by alternately laminating the carbon film 264 and the intermediate film 263, and each of the first protrusions 217 comprises a five-layer multilayer film formed by alternately laminating the carbon film 264 and the intermediate film 263. However, the first protrusions 218 nearest to the magnetic head core 211 may also comprise a multilayer film formed by alternately laminating the carbon film 264 and the intermediate film 263 as long as the second protrusions 218 are lower than the other protrusions.

Although, in this embodiment, the tree protrusions are provided on each of the side rails 212, the number of the protrusions is not limited to this. For example, two protrusions may be provided on each of the side rails 212.

Although, in this embodiment, a plurality of protrusions are provided on each of the side rails 212, the plurality of the protrusions may be provided in the negative pressure groove 215 besides the side rails 212.

EXAMPLES

Experimental Example 1

Figure 19:
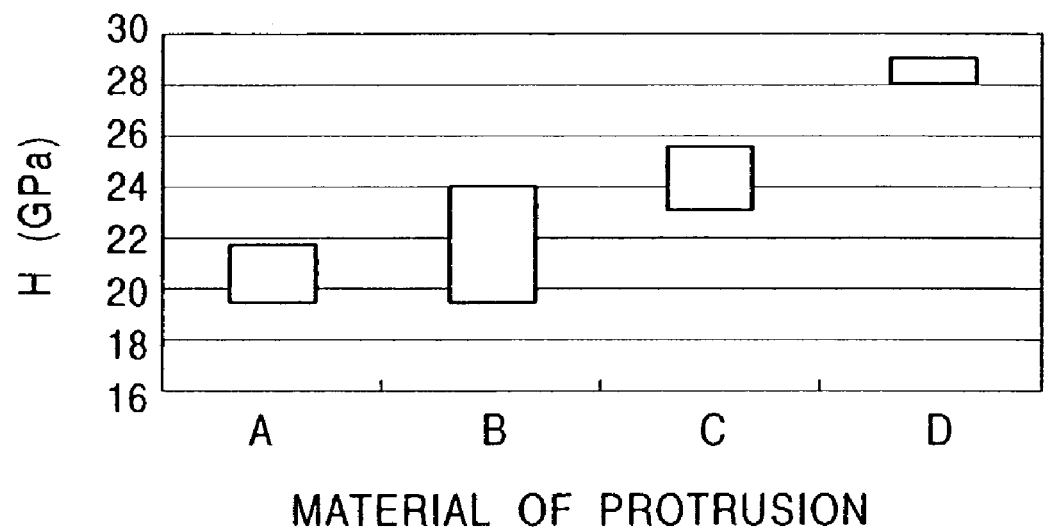
FIG. 19 is a diagram showing the measurements of the film hardness of the materials used for forming a carbon film of the outermost surface of each protrusion of a magnetic head slider.
Figure 20:
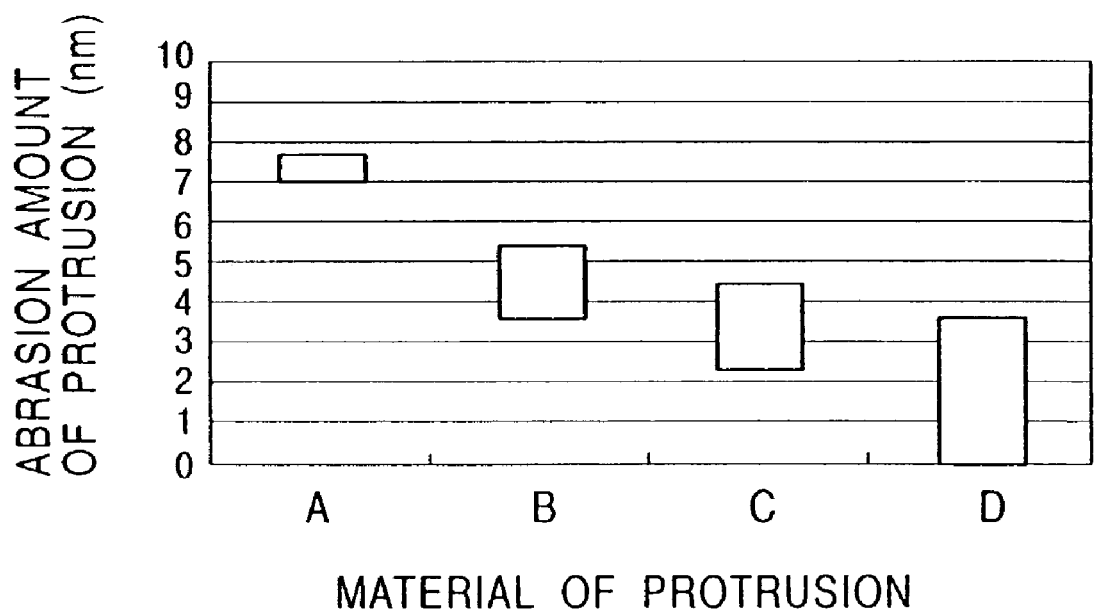
FIG. 20 is a diagram showing the abrasion amounts of the materials used for forming a carbon film of the outermost surface of each protrusion of a magnetic head slider.

In manufacturing a magnetic head slider having the shape shown in FIGS. 1 and 2, the material used for forming the second carbon film 64 on the outermost surface of each of the first and second protrusions 17 and 18 was changed to A, B, C and D below to examine the film hardness and abrasion resistance of the protrusions. The results are shown in FIGS. 19 and 20.

In the magnetic head slider manufactured in this example, the rectangular slider body 10 had a long side length of 1.241 mm and a width of 1.0 mm, the negative pressure groove 15 had an air flow inlet side width of 0.1 mm, a maximum width 0.78 mm, and a depth (the distance from the surface of the step 20) of 2.5 μm, each of the side rails 12 had a maximum width of 0.34 mm, a minimum width of 0.08 mm, and a height (the distance from the surface of the step 20) of 0.25 μm, the Si adhesive layer 61 had a thickness of 0.5 nm, the first carbon film had a thickness of 4.5 mm, the first protrusions 17 had a diameter of 30 mm, the second protrusions 18 had a long diameter of 75 mm, and a short diameter of 30 mm, each of the first and second protrusions 17 and 18 had a height of 35 nm, the Si intermediate film 63 constituting each of the protrusions had a thickness of 4 nm, the second carbon film had a thickness of 31 nm, and the distance between the second protrusions 18 and the magnetic gap G was set to 300 μm. The slider body 10 was set so that the flying amount was 25 nm, and the pitch angle gas 100 μRad.

The material A was produced by using methane gas as the reaction gas supplied to the deposition apparatus, and controlling the substrate bias to 110 W in the step shown in FIG. 6A in which the carbon film was formed by the ECRCVD method on the Si intermediate film 63 formed on the substrate 10C made of $Al_2O_3TiC$ through the Si adhesive layer 61 and the first carbon film 62. The hydrogen content of the resultant film was 38 atomic %.

The material B was produced by the same method as the material A except that ethylene gas was used as the reaction gas supplied to the deposition apparatus, and the substrate bias was controlled to 200 W. The hydrogen content of the resultant film was 28 atomic %.

The material C was produced by the same method as the material B except that the substrate bias was controlled to 400 W. The hydrogen content of the resultant film was 26 atomic %.

The material D comprised cathodic arc carbon, and the hydrogen content of the resultant film was substantially 0 atomic %.

The abrasion resistance was examined by measuring the heights of the protrusions after 5,000 ordinary operations of CSS. In FIG. 20, the abrasion amount of the protrusions shown on the ordinate represents the difference between the initial height of the protrusions and the height of the protrusions after 50,000 CSS operations.

The results shown in FIG. 19 indicate that the film hardness H of the protrusions comprising the outermost carbon film made of the material A has a distribution ranging from about 20 GPa to about 22 GPa and having an average of about 21 GPa. The film hardness H of the protrusions comprising the outermost carbon film made of the material B has a distribution ranging from about 20 GPa to about 24 GPa and having an average of about 22 GPa. The film hardness H of the protrusions comprising the outermost carbon film made of the material C has a distribution ranging from about 23.6 GPa to about 25.8 GPa and having an average of about 24.2 GPa. The film hardness H of the protrusions comprising the outermost carbon film made of the material D has a distribution ranging from about 28 GPa to about 29.4 GPa and having an average of about 28.7 GPa.

The results shown in FIG. 20 indicate that the protrusions comprising the outermost carbon film made of the material A having a film hardness of about 21 GPa exhibit an abrasion amount of as high as 7 nm or more. It is also found that the protrusions comprising the outermost carbon film made of the material B having a film hardness of about 22 GPa exhibit an abrasion amount of 5 nm or less, and thus have excellent abrasion resistance as compared with the material A. It is further found that the protrusions comprising the outermost carbon film made of the material C having a film hardness of about 24.2 GPa exhibit an average abrasion amount of 3.5 nm, and the protrusions comprising the outermost carbon film made of the material D having a film hardness of about 28.7 GPa exhibit an average abrasion amount of 1.8 nm. Therefore, the materials C and D are found to have more excellent abrasion resistance.

The results shown in FIG. 20 indicate that the protrusions showing an abrasion amount in the range of 5 nm or lees, which causes no practical problem (low adhesion torque) are made of a material having a film hardness of 22 GPa or more. It can thus be confirmed that the outermost carbon film of each of the protrusions provided on the rails formed on the slider body comprises a carbon film having a film hardness of 22 GPa or more.

Experimental Example 2

The magnetic head slider S was manufactured by the same method as Experimental Example 1 except that the second carbon film 64 of each of the first and second protrusions 17 and 18 was made of the material B, and the first carbon film formed on each of the side rails 12 was changed in the range shown in Table 1 below. The amount of the lubricant adhered and the abrasion resistance of the protrusions were measured. In this example, perfluoropolyether was used as the lubricant.

The results are shown in Table 1. In the column of the amount of the lubricant adhered in Table 1, ○ shows no adhesion of the lubricant, and Δ shows the occurrence of adhesion of the lubricant. In the column of the abrasion resistance in Table 1, ◉ shows substantially no abrasion resistance of protrusions, and an abrasion amount lower than the measurement limit of the abrasion amount, ○ shows a small abrasion amount of the protrusions of 5 nm or less, and Δ shows a large abrasion amount of the protrusions of 5 to 10 nm.

TABLE 1

| Sample No. | Raw material | Deposition method | Hydrogen content of first carbon film (atomic %) | Amount of lubricant adhered | Abrasion resistance |
|---|---|---|---|---|---|
| 1 | Methane gas | CVD | 48% | ○ | Δ |
| 2 | Methane gas | CVD | 39% | ○ | Δ |
| 3 | Ethylene gas | CVD | 35% | ○ | Δ |
| 4 | Ethylene gas | CVD | 29% | Δ | ○ |
| 5 | Ethylene gas | CVD | 27% | Δ | ○ |
| 6 | Graphite | Arc discharge | 0% | Δ | ◉ |

The results shown in Table 1 reveal that Sample Nos. 1 to 3 each comprising the carbon film having a hydrogen content of 35 atomic % or more exhibit no adhesion of the lubricant, and good results. It is also found that Sample Nos. 4 to 6 each comprising the carbon film having a hydrogen content of less than 30 atomic % exhibit less abrasion of the protrusions and good abrasion resistance, but produces adhesion of the lubricant.

Experimental Example 3

Figure 21:
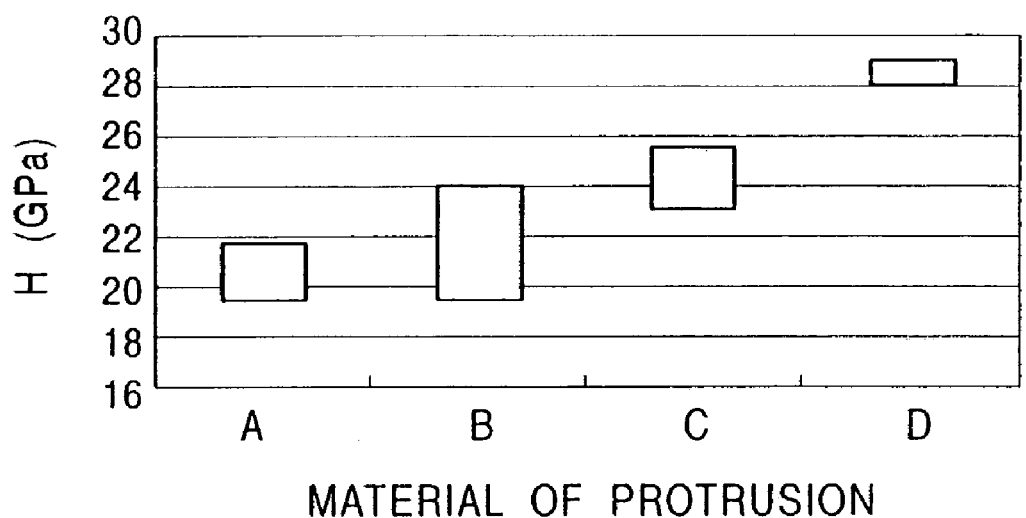
FIG. 21 is a diagram showing the measurements of the film hardness of the materials used for forming a carbon film of the outermost surface of each protrusion of a magnetic head slider.
Figure 22:
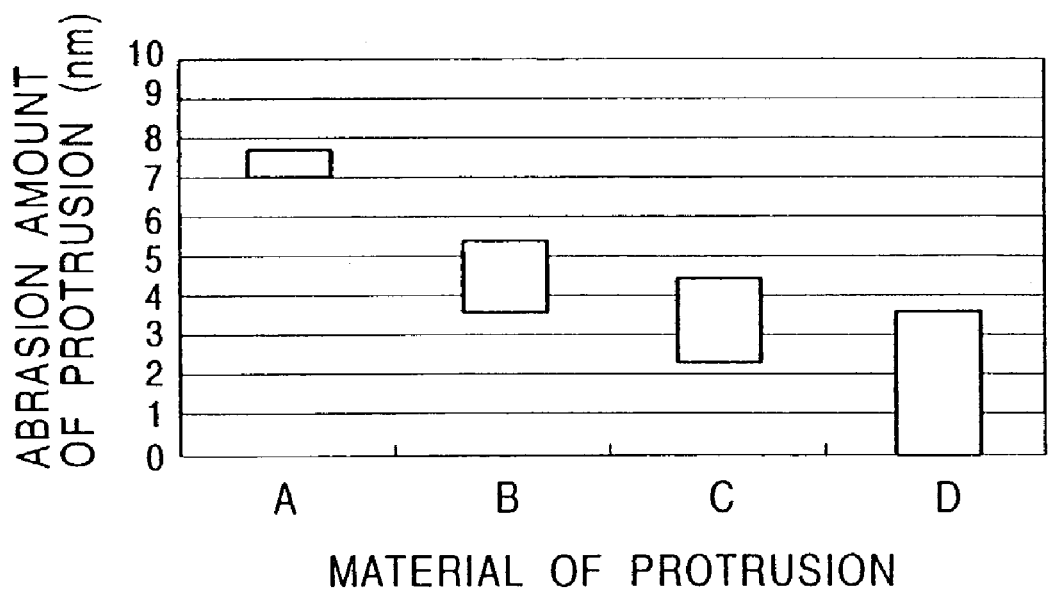
FIG. 22 is a diagram showing the abrasion amounts of the materials used for forming a carbon film of the outermost surface of each protrusion of a magnetic head slider.
Figure 23:
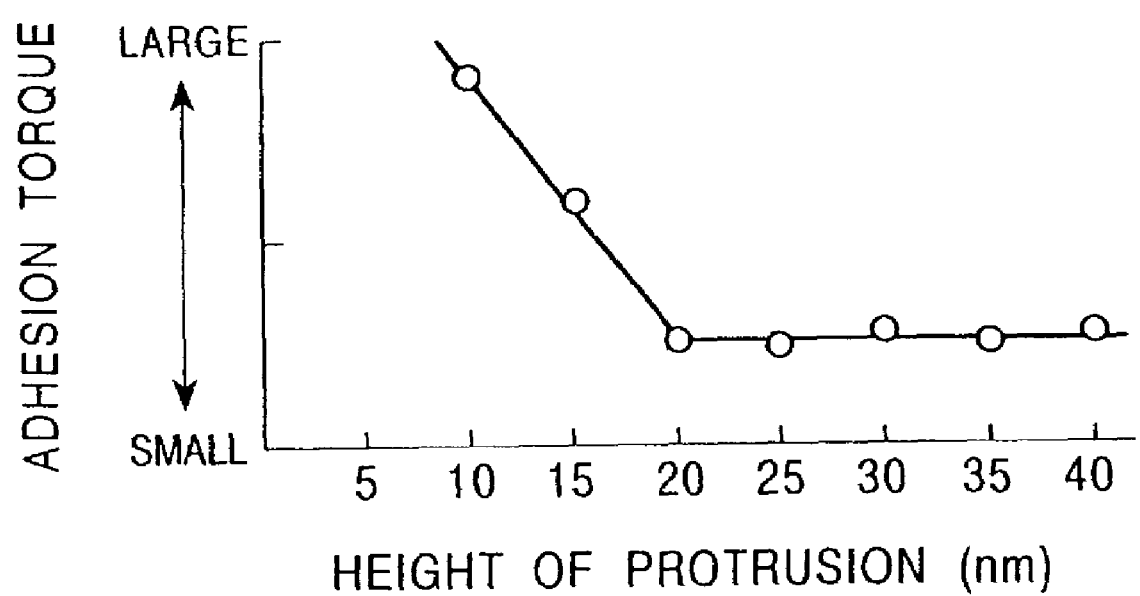
FIG. 23 is a graph showing the relation between the height of each protrusion and adhesion torque.

In manufacturing a magnetic head slider having the shape shown in FIGS. 7 and 8, the material used for forming the first and second protrusions 117 and 118 was changed to A, B, C and D below to examine the film hardness and abrasion resistance of the protrusions. The results are shown in FIGS. 21 to 23.

In the magnetic head slider manufactured in this example, the rectangular slider body 110 had a long side length of 1.2 mm and a width of 1.0 mm, the negative pressure groove 115 had an air flow inlet side width of 0.12 mm, a maximum width 0.36 mm, a depth of 2.5 μm, and a distance of 0.17 μm from the surface of the steps 120, each of the side rails 112 had a maximum width of 0.34 mm, and a minimum width of 0.06 mm, the first protrusions 117 had a diameter of 30 mm, the second protrusions 118 had a long diameter of 75 mm, and a short diameter of 30 mm, each of the first and second protrusions 117 and 118 had a height of 35 nm, and the distance between the second protrusions 118 and the magnetic gap G was set to 300 μm. The slider body 110 was set so that the flying amount was 25 nm, and the pitch angle gas 100 μRad.

The material A was produced by using methane gas as the reaction gas supplied to the deposition apparatus, and controlling the substrate bias to 110 W in the step shown in FIG. 11A in which the carbon film was formed by the ECRCVD method on the Si intermediate film 163 formed on the substrate 110C made of $Al_2O_3TiC$. The hydrogen content of the resultant film was 42.5 atomic %.

The material B was produced by the same method as the material A except that ethylene gas was used as the reaction gas supplied to the deposition apparatus, and the substrate bias was controlled to 200 W. The hydrogen content of the resultant film was 29 atomic %.

The material C was produced by the same method as the material B except that the substrate bias was controlled to 400 W. The hydrogen content of the resultant film was 27 atomic %.

The material D comprised cathodic arc carbon, and the hydrogen content of the resultant film was substantially 0 atomic %.

The film hardness was determined by measuring a penetration depth with a load using a penetration hardness testing machine, and determining according to the following equation (1). As a measurement indenter provided on the penetration hardness testing machine, a diamond triangular pyramid indenter having an open angle (α) of 65° was used, as shown in FIG. 5. In FIG. 5, Ap denotes a projected area.

$$\text{Film hardness} = P/As = 37.962 \times 10^{-3} \times P/h^2 \qquad (1)$$

(wherein P represents the load, h represents the penetration depth, and As represents the surface area of the triangular pyramid indenter with displacement h).

The abrasion resistance was examined by measuring the heights of the protrusions after 5,000 ordinary operations of CSS. In FIG. 22, the abrasion amount of the protrusions shown on the ordinate represents the difference between the initial height of the protrusions and the height of the protrusions after 50,000 CSS operations.

The results shown in FIG. 21 indicate that the film hardness H of the protrusions made of the material A has a distribution ranging from about 20 GPa to about 22 GPa and having an average of about 21 GPa. The film hardness H of the protrusions made of the material B has a distribution ranging from about 20 GPa to about 24 GPa and having an average of about 22 GPa. The film hardness H of the protrusions made of the material C has a distribution ranging from about 23.6 GPa to about 25.8 GPa and having an average of about 24.2 GPa. The film hardness H of the protrusions made of the material D has a distribution ranging from about 28 GPa to about 29.4 GPa and having an average of about 28.7 GPa.

The results shown in FIG. 22 indicate that the protrusions made of the material A having a film hardness of about 21 GPa exhibit an abrasion amount of as high as 7 nm or more. It is also found that the protrusions made of the material B having a film hardness of about 22 GPa exhibit an abrasion amount of 5 nm or less, and thus have excellent abrasion resistance as compared with the material A. It is further found that the protrusions made of the material C having a film hardness of about 24.2 GPa exhibit an average abrasion amount of 3.5 nm, and the protrusions made of the material D having a film hardness of about 28.7 GPa exhibit an average abrasion amount of 1.8 nm. Therefore, the materials C and D are found to have more excellent abrasion resistance.

The results of measurement of the relation between the height of protrusions and adhesion torque are shown in FIG. 23. The protrusions were made of the material A.

The results shown in FIG. 23 indicate that as the height of the protrusions decreases, a meniscus is produced between the slider body and the magnetic disk to increase adhesion torque, and that the torque abruptly increases when the height of the protrusions is 30 nm or less. Therefore, the abrasion amount of the protrusions which causes no practical problem is in the range of 5 nm or less.

The results shown in FIGS. 21, 22 and 23 indicate that the samples producing an abrasion amount of protrusions in the range of 5 nm or less, which causes no practical problem, are made of a material having a film hardness of 22 GPa or more. It can thus be confirmed to be effective means for solving the problems that the protrusions provided on each of the rails formed on the slider body are made of a material having a film hardness of 22 GPa or more.

Experimental Example 4

Figure 25:
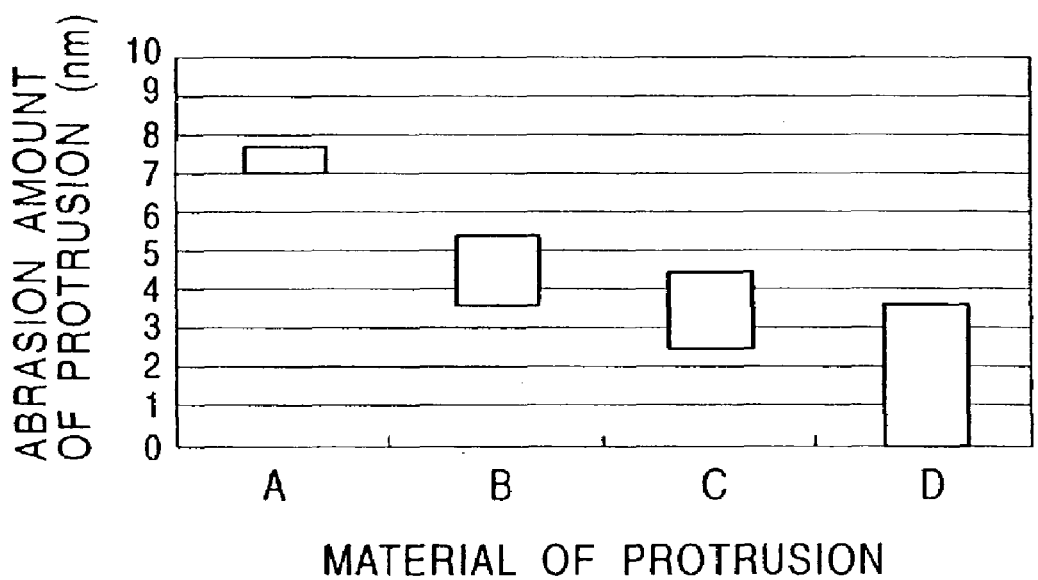
FIG. 25 is a diagram showing the abrasion amounts of the materials used for forming a carbon film of the outermost surface of each protrusion of a magnetic head slider.
Figure 26:
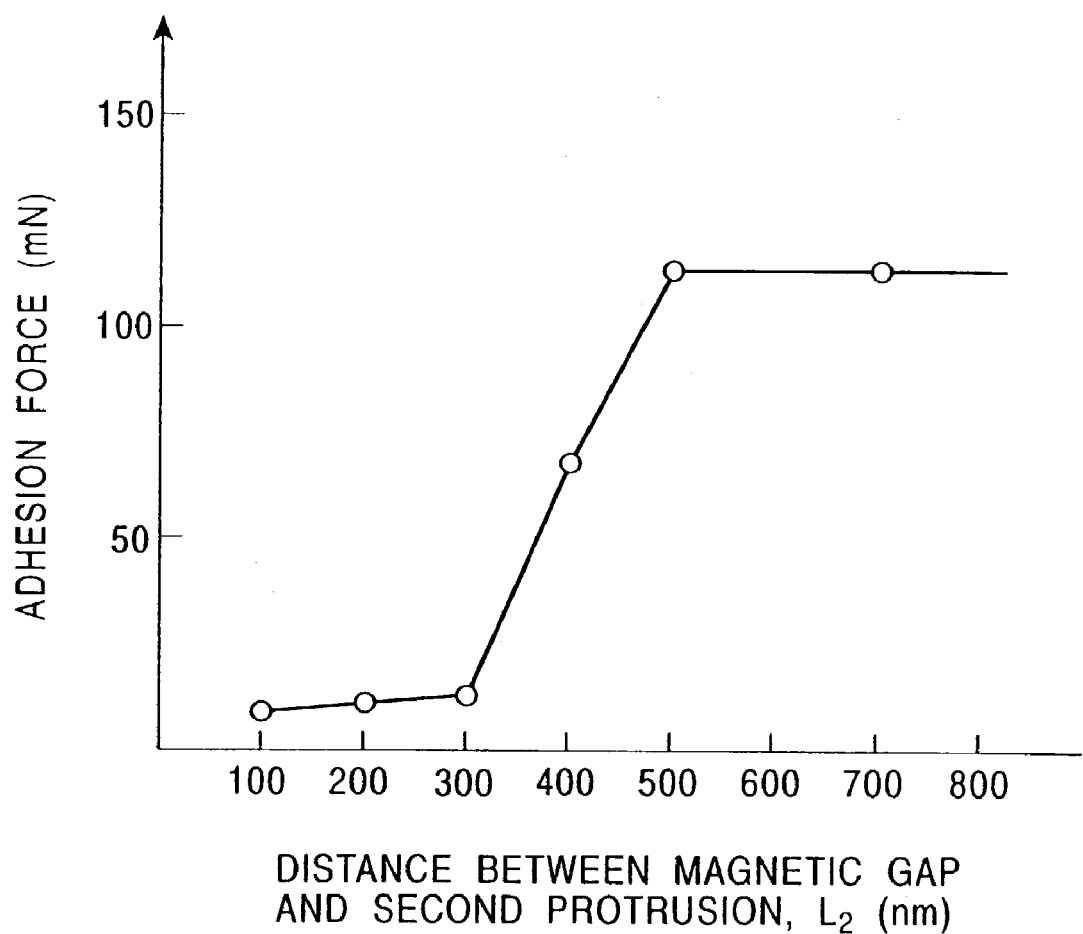
FIG. 26 is a graph showing the relation between the distance between a second protrusion and the magnetic gap and attraction force.

In manufacturing a magnetic head slider having the shape shown in FIGS. 13 and 14, the material used for forming the carbon film 264 of each of the first, second and third protrusions 217, 218 and 219 was changed to A, B, C and D below to examine the film hardness and abrasion resistance of the protrusions. The results are shown in FIGS. 25 and 26.

In the magnetic head slider manufactured in this example, the rectangular slider body 210 had a long side length of 1.241 mm and a width of 1.0 mm, the negative pressure groove 215 had an air flow inlet side width of 0.1 mm, a maximum width 0.78 mm, and a depth of 2.5 μm, each of the side rails 212 had a maximum width of 0.34 mm, a minimum width of 0.08 mm, and a height of 0.25 μm, the first intermediate film 263 had a thickness of 0.5 nm, the first and third protrusions 217 and 219 had a diameter of 30 mm, the second protrusions 218 had a long diameter of 75 mm, and a short diameter of 30 mm, the first protrusions 217 had a height of 45 nm, the third protrusions 219 had a height of 35 nm, the second protrusions 218 had a height of 25 nm, the carbon film of each of the protrusions had a thickness of 6 nm, the intermediate film had a thickness of 4 nm, and the distance $L_2$ between the second protrusions 218 and the magnetic gap G was set to 300 μm. The slider body 210 was set so that the flying amount was 25 nm, and the pitch angle gas 100 μRad.

The material A was produced by using methane gas as the reaction gas supplied to the deposition apparatus, and controlling the substrate bias to 110 W in the steps shown in FIGS. 17 and 18 in which the carbon film 264 was formed by the ECRCVD method to form the six-layer multilayer film comprising the Si intermediate film 263 and the carbon film 264 alternately laminated on the substrate 210C made of $Al_2O_3TiC$. The hydrogen content of the resultant film was 38 atomic %.

The material B was produced by the same method as the material A except that ethylene gas was used as the reaction gas supplied to the deposition apparatus, and the substrate bias was controlled to 200 W. The hydrogen content of the resultant film was 28 atomic %.

The material C was produced by the same method as the material B except that the substrate bias was controlled to 400 W. The hydrogen content of the resultant film was 26 atomic %.

The material D comprised cathodic arc carbon, and the hydrogen content of the resultant film was substantially 0 atomic %.

The abrasion resistance was examined by measuring the heights of the protrusions after 5,000 ordinary operations of CSS. In FIG. 25, the abrasion amount of the protrusions shown on the ordinate represents the difference between the initial height of the protrusions and the height of the protrusions after 50,000 CSS operations.

Figure 24:
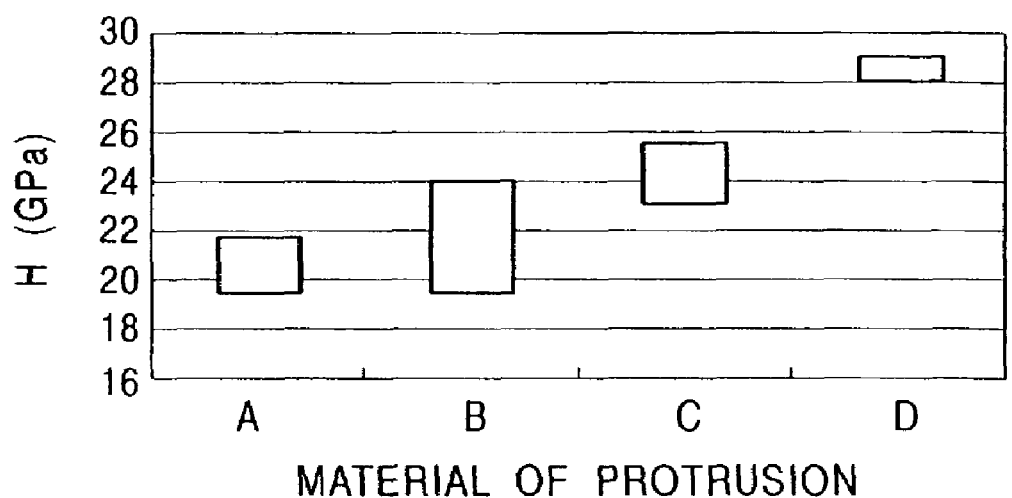
FIG. 24 is a diagram showing the measurements of the film hardness of the materials used for forming a carbon film of the outermost surface of each protrusion of a magnetic head slider.

The results shown in FIG. 24 indicate that the film hardness H of the protrusions comprising the carbon film made of the material A has a distribution ranging from about 20 GPa to about 22 GPa and having an average of about 21 GPa. The film hardness H of the protrusions comprising the carbon film made of the material B has a distribution ranging from about 20 GPa to about 24 GPa and having an average of about 22 GPa. The film hardness H of the protrusions comprising the carbon film made of the material C has a distribution ranging from about 23.6 GPa to about 25.8 GPa and having an average of about 24.2 GPa. The film hardness H of the protrusions comprising the carbon film made of the material D has a distribution ranging from about 28 GPa to about 29.4 GPa and having an average of about 28.7 GPa.

The results shown in FIG. 25 indicate that the protrusions comprising the carbon film made of the material A having a film hardness of about 21 GPa exhibit an abrasion amount of as high as 7 nm or more. It is also found that the protrusions comprising the carbon film made of the material B having a film hardness of about 22 GPa exhibit an abrasion amount of 5 nm or less, and thus have excellent abrasion resistance as compared with the material A. It is further found that the protrusions comprising the carbon film made of the material C having a film hardness of about 24.2 GPa exhibit an average abrasion amount of 3.5 nm, and the protrusions comprising the carbon film made of the material D having a film hardness of about 28.7 GPa exhibit an average abrasion amount of 1.8 nm. Therefore, the materials C and D are found to have more excellent abrasion resistance.

The results shown in FIG. 25 indicate that the samples producing an abrasion amount of protrusions in the range of 5 nm or less, which causes no practical problem (low adhesion torque), comprise the carbon film 264 made of a material having a film hardness of 22 GPa or more. It can thus be confirmed to be effective that the protrusions provided on each of the rails formed on the slider body comprise the outermost carbon film made of a material having a film hardness of 22 GPa or more.

Experimental Example 5

The magnetic head slider S was manufactured by the same method as Experimental Example 4 except that the distance $L_2$ between the magnetic gap G and the second protrusions 218 was changed in the range of 300 to 500 µm. The occurrence of adhesion of the medium-facing surface of the slider body 210 to the magnetic disk was examined. The occurrence of adhesion was examined by measuring the adhesion force between the medium-facing surface of the slider body and the magnetic disk when the manufactured magnetic head slider S was set in a CSS tester, and the magnetic disk was rotated at 7200 rpm. The results are shown in FIG. 26.

The results shown in FIG. 25 indicate that the adhesion force increases when the distance $L_2$ between the magnetic gap G and the second protrusions 218 exceeds 300 µm, and particularly, with the distance $L_2$ of over 400 µm, the adhesion force abruptly increases. It is also found that with the distance $L_2$ of less than 300 µm, the adhesion force is in the range of 49 mN (5 gf) or less with causing no practical problem, and particularly, with the distance $L_2$ of 300 µm or less, adhesion can be prevented.

It can thus be confirmed to be effective that the distance between the magnetic gap and the protrusions (the second protrusions) nearest to the magnetic head core is 25% or less of the length of the slider body.

As described above, in the magnetic head slider of the present invention, a first carbon film having corrosion resistance is provided, through an adhesive layer, on the surfaces of at least the rails among the medium-facing surface and the rails of the slider body, and an intermediate film and a second carbon film are alternately formed on the first carbon film to form protrusions. Since the outermost second carbon film of the second carbon films, which constitute each of the protrusions, has abrasion resistance, the abrasion resistance of the protrusions provided on the medium-facing surface and the rails of the slider body can be improved while the manufacturing efficiency is kept high, and corrosion of the magnetic head core provided on the slider body can be prevented.

The method of manufacturing the magnetic head slider of the present invention has the above-described construction, and is thus suitably used for manufacturing the magnetic head slider of the present invention.

Furthermore, in the magnetic head slider of the present invention, the protrusions lower than the other protrusions are interposed between the medium-facing surface and the magnetic disk in the portion near the magnetic head core side (the air flow inlet side) during stopping of the magnetic disk, and thus the meniscus of the lubricant coated on the surface of the magnetic disk has a large radius in the periphery of each of the lower protrusions. It is thus possible to improve adhesion of the medium-facing surface of the slider body to the magnetic disk due to the liquid film of the lubricant, and improve the effect of decreasing the adhesion of the slider body to the magnetic head.

Since the protrusions nearest to the magnetic head core are lower than the other protrusions, it is possible to prevent the protrusions nearest to the magnetic head core from projecting from the magnetic gap provided on the magnetic head core toward the magnetic disk when the magnetic head slider flies at a pitch angle of about 100 µRad. Namely, the magnetic gap can be advantageously brought nearer to the magnetic disk than the plurality of protrusions.

The method of manufacturing the magnetic head slider of the present invention has the above-described construction, and is thus suitably used for manufacturing the magnetic head slider of the present invention.

Furthermore, in the magnetic head slider of the present invention, the protrusions provided on the rails provided on the medium-facing surface of the slider body on the magnetic disk side, for generating buoyant force, have a film hardness of 22 GPa or more to improve the abrasion resistance of the protrusions. It is thus possible to prevent abrasion of the protrusions in sliding on the magnetic disk when the magnetic disk is started and stopped, and an increase in the area of contact between the slider and the magnetic head, thereby preventing an increase in adhesion force between the slider and the magnetic disk. Therefore, the magnetic head element provided on the magnetic head core, and the recording layer of the magnetic disk can be prevented from being damaged due to an increase in the adhesion force between the slider and the magnetic disk when rotation of the magnetic disk is started.

What is claimed is:

1. A magnetic head slider comprising a magnetic head core provided in a plate-shaped slider body so that the slider flies and moves above a magnetic disk to write or read magnetic information on a medium;

wherein a plurality of rails is formed for producing buoyant force on either side edge portion of the medium-facing surface of the slider body on the magnetic disk side so as to extend from the air flow inlet side to the air flow outlet side, at least two side rails on either side edge portion are provided in the direction from the air flow inlet side to the air flow outlet side of the slider body, wherein first two side rails of the at least two side rails are provided on the air flow inlet side, each of the first two side rails having a first pad formed on a portion of surface thereof, wherein second two side rails of the at least two side rails are provided on the air flow outlet side, each of the second two side rails having a second pad formed on a portion of surface thereof, wherein a first protrusion is provided on the medium-facing surface of the first side rail not provided with the pad, and wherein the first protrusion has a film hardness of 22 GPa or more.

2. The magnetic head slider according to claim 1 wherein the protrusion comprises a carbon film having a hydrogen content of less than 43 atomic %.

3. The magnetic head slider according to claim 1, wherein each of the plurality of the rails comprises a crown formed thereon.

4. The magnetic head slider according to claim 1, wherein the magnetic head core comprises a giant magnetoresistive element.

5. The magnetic head slider according to claim 1, wherein the first protrusion is formed on the air flow inlet side of the first pad.

6. The magnetic head slider according to claim 1, wherein the first protrusion is formed on the air flow outlet side of the first pad.

7. The magnetic head slider according to claim 6, wherein the first protrusion comprises a plurality of protrusions.

8. The magnetic head slider according to claim 1, wherein the first protrusion is formed on each side of the air flow inlet side and the air flow outlet side of the first pad.

9. The magnetic head slider according to claim 1, wherein a second protrusion is provided on the medium-facing surface of the second side rail not provided with the second pad, the second protrusion is formed on the air flow inlet side of the second pad, and the second protrusion has a film hardness of 22 GPa or more.

* * * * *